(12) United States Patent
Hashimoto et al.

(10) Patent No.: US 10,464,604 B2
(45) Date of Patent: Nov. 5, 2019

(54) AUTONOMOUS DRIVING SYSTEM

(71) Applicant: Toyota Jidosha Kabushiki Kaisha, Toyota-shi, Aichi-ken (JP)

(72) Inventors: Ryuta Hashimoto, Susono (JP); Yoshinori Watanabe, Gotenba (JP); Kenichiro Aoki, Miyoshi (JP); Tomoyuki Kuriyama, Hadano (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 101 days.

(21) Appl. No.: 15/665,863

(22) Filed: Aug. 1, 2017

(65) Prior Publication Data

US 2018/0043935 A1    Feb. 15, 2018

(30) Foreign Application Priority Data

Aug. 10, 2016 (JP) .................. 2016-157779

(51) Int. Cl.
*B62D 15/02* (2006.01)
*G06Q 50/30* (2012.01)
(Continued)

(52) U.S. Cl.
CPC ....... *B62D 15/0255* (2013.01); *B62D 15/025* (2013.01); *G05D 1/0212* (2013.01);
(Continued)

(58) Field of Classification Search
CPC .............. B62D 15/0255; B62D 15/025; G05D 1/0212; G06Q 50/30; G08G 1/163; G08G 1/167
See application file for complete search history.

(56) References Cited

U.S. PATENT DOCUMENTS

2009/0012703 A1   1/2009  Aso et al.
2015/0166062 A1*  6/2015  Johnson ............... B60W 30/12
                                                701/41
2018/0046196 A1   2/2018  Hashimoto et al.

FOREIGN PATENT DOCUMENTS

DE    102012025328 A1    7/2013
JP      2002334393 A    11/2002
(Continued)

OTHER PUBLICATIONS

U.S. Appl. No. 15/669,049, filed Aug. 4, 2017; Inventors: Ryuta Hashimoto et al.
(Continued)

*Primary Examiner* — Michael D Lang
(74) *Attorney, Agent, or Firm* — Dinsmore & Shohl LLP

(57) ABSTRACT

Each of a plurality of autonomous driving vehicles configuring an autonomous driving system executes lane selection determination processing of acquiring information concerning an empty space situation in an adjacent lane that is adjacent to a lane where an own vehicle is traveling, and determining whether or not to select the adjacent lane as an own vehicle travel lane in accordance with an empty space situation in the adjacent lane. When the adjacent lane is selected as the own vehicle travel lane by the lane selection determination processing, lane change to the adjacent lane is performed autonomously, or lane change to the adjacent lane is proposed to a driver. The autonomous driving system gives variation to an execution interval of the lane selection determination processing among the plurality of autonomous driving vehicles.

6 Claims, 13 Drawing Sheets

(51) Int. Cl.
    *G08G 1/00*           (2006.01)
    *G08G 1/16*           (2006.01)
    *G05D 1/02*           (2006.01)

(52) U.S. Cl.
    CPC ............. *G06Q 50/30* (2013.01); *G08G 1/163* (2013.01); *G08G 1/167* (2013.01); *G08G 1/20* (2013.01); *B60W 2750/30* (2013.01); *G05D 1/0278* (2013.01); *G05D 2201/0213* (2013.01)

(56) References Cited

FOREIGN PATENT DOCUMENTS

| | | | |
|---|---|---|---|
| JP | 2006277546 | A | 10/2006 |
| JP | 2009018623 | A | 1/2009 |
| WO | 2007102405 | A1 | 9/2007 |

OTHER PUBLICATIONS

Non-Final Office Action dated May 29, 2019 in U.S. Appl. No. 15/669,049, filed Aug. 4, 2017.
Final Office Action dated Sep. 11, 2019 in U.S. Appl. No. 15/669,049.

\* cited by examiner

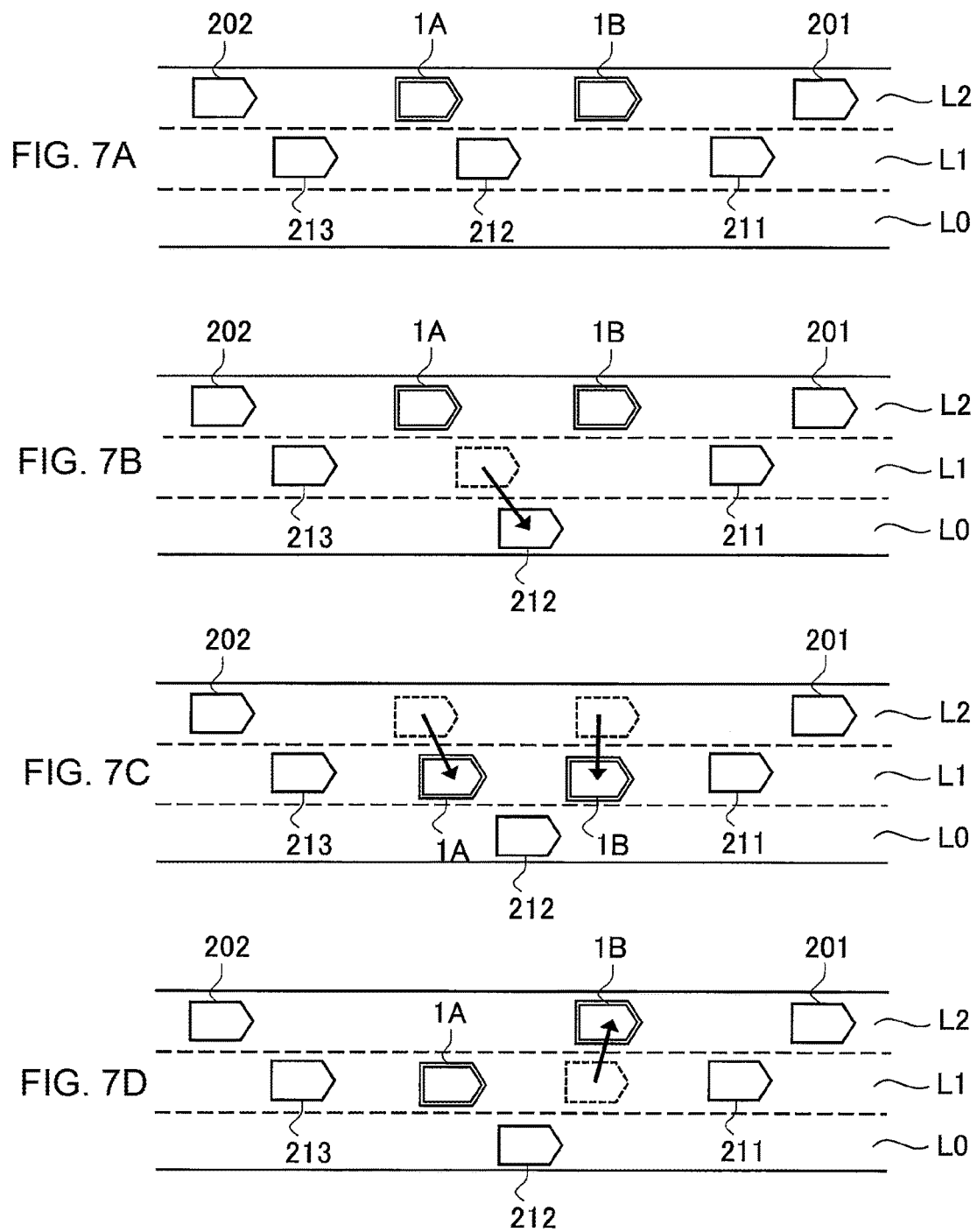

AUTONOMOUS DRIVING SYSTEM

CROSS-REFERENCE TO RELATED APPLICATION

This application claims priority to Japanese Patent Application No. 2016-157779, filed on Aug. 10, 2016, the entire contents of which are hereby incorporated by reference.

BACKGROUND

Field

The present disclosure relates to an autonomous driving system including a plurality of autonomous driving vehicles.

Background Art

DE 102012025328A1 discloses a device that determines whether or not to execute lane change based on vehicle speeds of and inter-vehicle distances of vehicles traveling in an adjacent lane when determining that a driver has an intention to perform lane change.

SUMMARY

As autonomous driving vehicles become more widely used henceforth, a scene will become more common in which a plurality of autonomous driving vehicles having the same function are traveling in the same lane. Autonomous driving vehicles are highly likely to be provided with the function of autonomously performing lane change to a less crowded lane, as in the above described prior art, for example. Consequently, in the scene as described above, it can happen that a plurality of autonomous driving vehicles make a lane change to an adjacent lane at the same time in accordance with a change in an empty space situation of the adjacent lane.

However, if such an event occurs, empty space situations are replaced between the two adjacent lanes, so that there arises a possibility that lane change to an original lane will be made again, that is, a possibility that hunting of lane change will occur.

The present disclosure is made in the light of the problem as described above, and has an object to provide an autonomous driving system that can restrain a plurality of autonomous driving vehicles having the same function from performing lane change to an adjacent lane at the same time.

A first autonomous driving system provided by the present disclosure includes a plurality of autonomous driving vehicles. Each of the plurality of autonomous driving vehicles includes at least an information acquisition section, a lane selection section and a control section. The information acquisition section is configured to acquire information concerning an empty space situation in an adjacent lane that is adjacent to a lane where an own vehicle is traveling, when the own vehicle travels on a road having a plurality of lanes. The lane selection section is configured to execute lane selection determination processing at predetermined execution intervals. The lane selection determination processing is a processing of determining whether or not to select the adjacent lane as an own vehicle travel lane in accordance with the empty space situation in the adjacent lane. The control section is configured to make lane change to the adjacent lane autonomously, or propose lane change to the adjacent lane to a driver, when the lane selection section selects the adjacent lane as the own vehicle travel lane. The execution intervals of the lane selection determination processing are given variation among the plurality of autonomous driving vehicles.

According to the first autonomous driving system configured as above, the execution intervals of the lane selection determination processing are varied among the autonomous driving vehicles, whereby when the empty space situation in the adjacent lane changes, it happens that lane change is made in a certain vehicle, but lane change is not made in other vehicles. Consequently, a plurality of vehicles are restrained from making lane change to the adjacent lane at the same time.

Incidentally, when a response time period of lane change to the change of the empty space situation in the adjacent lane varies, it is unlikely to suit to a sense of an occupant, and the occupant is likely to feel a sense of discomfort. Consequently, the execution interval of the lane selection determination processing may be fixed in each of the autonomous driving vehicles. According to this, when attention is paid to the single autonomous driving vehicle, lane change is made with a substantially fixed response time period, so that the occupant can be restrained from feeling a sense of discomfort.

Further, as for a value of the execution interval of the lane selection determination processing, the value may be changed every time the lane selection determination processing is executed. According to this, a probability of a plurality of autonomous driving vehicles having the execution intervals of the lane selection determination processing which are close to one another traveling one behind another on the same lane can be suppressed to be low.

A second autonomous driving system provided by the present disclosure includes a plurality of autonomous driving vehicles. Each of the plurality of autonomous driving vehicles includes at least an information acquisition section, a lane selection section and a control section. The information acquisition section is configured to acquire information concerning an empty space situation in an adjacent lane that is adjacent to a lane where an own vehicle is traveling, when the own vehicle travels on a road having a plurality of lanes. The lane selection section is configured to execute lane selection determination processing of determining whether or not to select the adjacent lane as an own vehicle travel lane in accordance with the empty space situation in the adjacent lane. The control section is configured to make lane change to the adjacent lane autonomously, or propose lane change to the adjacent lane to a driver, when a lane change instruction is given from the lane selection section. Further, the lane selection section is configured to give the lane change instruction to the control section, after waiting for a lapse of a predetermined delay time period, when the lane selection section selects the adjacent lane as the own vehicle travel lane. The delay time period which is set in the lane selection section is given variation among the plurality of autonomous driving vehicles.

According to the second autonomous driving system configured as above, the delay time period until the lane change instruction is outputted after the lane selection determination processing is executed is varied among the autonomous driving vehicles, and when the empty space situation in the adjacent lane changes, it happens that lane change is immediately performed in a certain vehicle, but lane change is not immediately performed in other vehicles. Thereby, a plurality of vehicles can be restrained from making lane change to the adjacent lane at the same time.

The lane selection section may be configured to perform the lane selection determination processing repeatedly at execution intervals that are shorter than the delay time period, which is set in the control section. Thereby, at the time point when the delay time period elapses, a newest determination result of the lane selection determination processing may become negative. In the case like this, the lane selection section may cancel giving the lane change instruction to the control section. According to the above, when the empty space situation in the adjacent lane changes, it happens that lane change is performed in a certain vehicle, but lane change is not performed in other vehicles. Consequently, a plurality of vehicles can be more effectively restrained from making lane change to the adjacent lane at the same time.

A third autonomous driving system provided by the present disclosure includes a plurality of autonomous driving vehicles. Each of the plurality of autonomous driving vehicles includes at least an information acquisition section, a lane selection section and a control section. The information acquisition section is configured to acquire information concerning an empty space situation in an adjacent lane that is adjacent to a lane where an own vehicle is traveling, when the own vehicle travels on a road having a plurality of lanes. The lane selection section is configured to execute lane selection determination processing of determining whether or not to select the adjacent lane as an own vehicle travel lane in accordance with the empty space situation in the adjacent lane, when a request for lane change is detected. The control section is configured to perform lane change to the adjacent lane autonomously, or propose lane change to the adjacent lane to a driver, when the lane selection section selects the adjacent lane as the own vehicle travel lane. Further, the lane selection section is configured to execute the lane selection determination processing, after waiting until a predetermined delay time period elapses, when the lane selection section detects the request for lane change. The delay time period which is set in the lane selection section is given variation among the plurality of autonomous driving vehicles.

According to the third autonomous driving system configured as above, the delay time period until executing the lane selection determination processing after detecting the request for lane change is varied among the autonomous driving vehicles, whereby when the empty space situation in the adjacent lane changes, it happens that in a certain vehicle, lane change is immediately performed, whereas in other vehicles, lane change is not performed immediately. Consequently, a plurality of vehicles are restrained from making lane change to the adjacent lane at the same time.

According to the autonomous driving system provided by the present disclosure, a plurality of vehicles are restrained from making lane change to the adjacent lane at the same time, so that occurrence of hunting of lane change is avoided, and a smooth traffic flow can be realized.

BRIEF DESCRIPTION OF DRAWINGS

FIG. 7A is a diagram illustrating an example of operations of autonomous driving vehicles by the autonomous driving system according to the first embodiment;

FIG. 7B is a diagram illustrating an example of operations of autonomous driving vehicles by the autonomous driving system according to the first embodiment;

FIG. 7C is a diagram illustrating an example of operations of autonomous driving vehicles by the autonomous driving system according to the first embodiment;

FIG. 7D is a diagram illustrating an example of operations of autonomous driving vehicles by the autonomous driving system according to the first embodiment;

DETAILED DESCRIPTION

Hereunder, embodiments of the present disclosure will be described with reference to the drawings. Note that when the numerals of the numbers, the quantities, the amounts, the ranges and the like of the respective elements are mentioned in the embodiments shown as follows, the present disclosure is not limited to the mentioned numerals unless specially explicitly described otherwise, or unless the disclosure is explicitly specified by the numerals theoretically. Further, the structures that are described in the embodiments shown as follows are not always indispensable to the disclosure unless specially explicitly shown otherwise, or unless the disclosure is explicitly specified by the structures theoretically.

First Embodiment 1-1. Configuration of Autonomous Driving Vehicle

Figure 1:
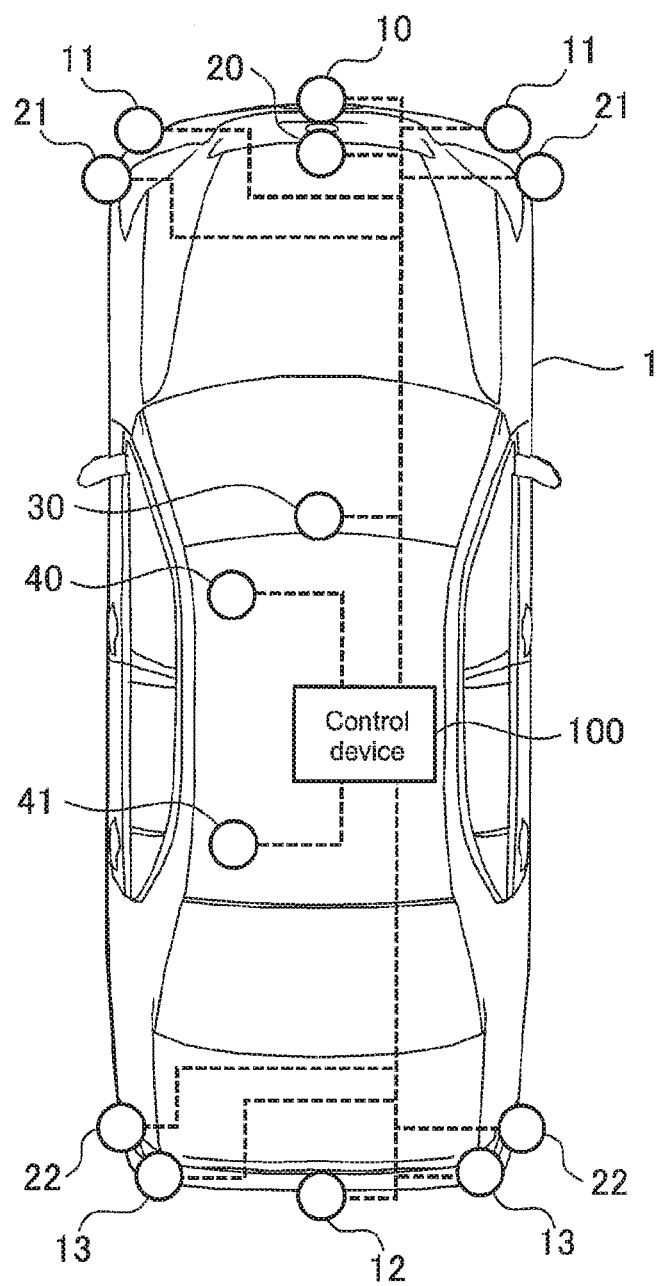
FIG. 1 is a view illustrating an example of an autonomous driving vehicle configuring an autonomous driving system according to a first embodiment.

The term autonomous driving system sometimes means a control system for autonomous driving that is mounted on an individual autonomous driving vehicle. However, an autonomous driving system in the present specification is defined as a traffic system that is constructed by a plurality of autonomous driving vehicles having the same function. FIG. 1 is a view illustrating an example of an autonomous driving vehicle according to the present embodiment. Individual autonomous driving vehicles as illustrated in FIG. 1 configure the autonomous driving system. Note that autonomous driving means that driving operations such as acceleration, deceleration and steering of a vehicle is executed without a driving operation of a driver.

As illustrated in FIG. 1, a vehicle (autonomous driving vehicle) 1 configuring the autonomous driving system includes an autonomous recognition sensor for directly acquiring information concerning a road on which the vehicle 1 is traveling and information concerning objects that are present in the surroundings of the vehicle 1. The autonomous recognition sensor includes at least one of LIDARs (LIDAR: Laser Imaging Detection and Ranging) 10, 11, 12 and 13, radars 20, 21 and 22 and a camera 30. Further, the vehicle 1 includes a communication device for indirectly acquiring at least a part of these kinds of information from an external system not illustrated. The communication device includes at least one of a road-vehicle communication device 40 and a mobile communication device 41. These autonomous recognition sensor and communication device are connected to a control device 100 that is mounted on the vehicle 1 directly or via a communication network such as a CAN (Controller Area Network) constructed in the vehicle.

The LIDARs include a front LIDAR 10 that detects an object in front of the vehicle 1, front side LIDARs 11 and 11 that detect objects in front sides of the vehicle 1, a rear LIDAR 12 that detects an object in rear of the vehicle 1, and rear side LIDARs 13 and 13 that detect objects in rear sides of the vehicle 1. The LIDARs 10 to 13 output object information concerning detected objects to the control device 100. The object information includes distances and directions of the detected objects from the vehicle 1. Based on the object information obtained by these LIDARs 10, 11, 12 and 13, the control device 100 can grasp a situation of substantially entire surroundings of the vehicle 1. Note that installation positions of the LIDARs and the number of LIDARs that are installed can be determined in accordance with scanning ranges of the LIDARs. Instead of a plurality of LIDARs, only one LIDAR that performs sensing of the entire surroundings of the vehicle 1 may be used.

The radars are millimeter wave radars, for example. The radars include a front radar 20 that detects an object in front of the vehicle 1, front short range radars 21 and 21 that detect objects in a vicinity of the front, and rear short range radars 22 and 22 that detect objects in a vicinity of the rear, for example. The radars 20 to 22 output object information concerning detected objects to the control device 100. The object information includes distances and directions of the detected objects from the vehicle 1.

The camera 30 is provided at a back side of a windshield of the vehicle 1, and picks up an image of a region in front of the vehicle 1, for example. The camera 30 may be a monocular camera, or a stereo camera. The camera 30 outputs picked-up image information to the control device 100. Note that the camera, the LIDARs and the radars do not necessarily have to be included redundantly.

The road-vehicle communication device 40 transmits own vehicle information that is information on the vehicle 1 to infrastructure equipment such as a road side device, and receives road traffic information from the infrastructure equipment. The road traffic information includes information concerning a surrounding situation of the vehicle 1. The road-vehicle communication includes communication with a road traffic information communication system (Vehicle Information and Communication system), for example. The road-vehicle communication device 40 outputs information concerning the surrounding situation of the vehicle 1 which is received to the control device 100.

The mobile communication device 41 transmits the own vehicle information of the vehicle 1 and information acquired by the autonomous recognition sensor to a server on the Internet via a mobile communication system such as 3G, 4G and LTE, and receives information concerning the surrounding situation of the vehicle 1 from the server. The mobile communication device 41 outputs the information concerning the surrounding situation of the vehicle 1 which is received to the control device 100. Note that the mobile communication device 41 and the road-vehicle communication device 40 do not necessarily have to be included redundantly. Further, these communication devices are not always indispensable in the vehicle 1.

1-2. Configuration of Control System of Autonomous Driving Vehicle

Figure 2:
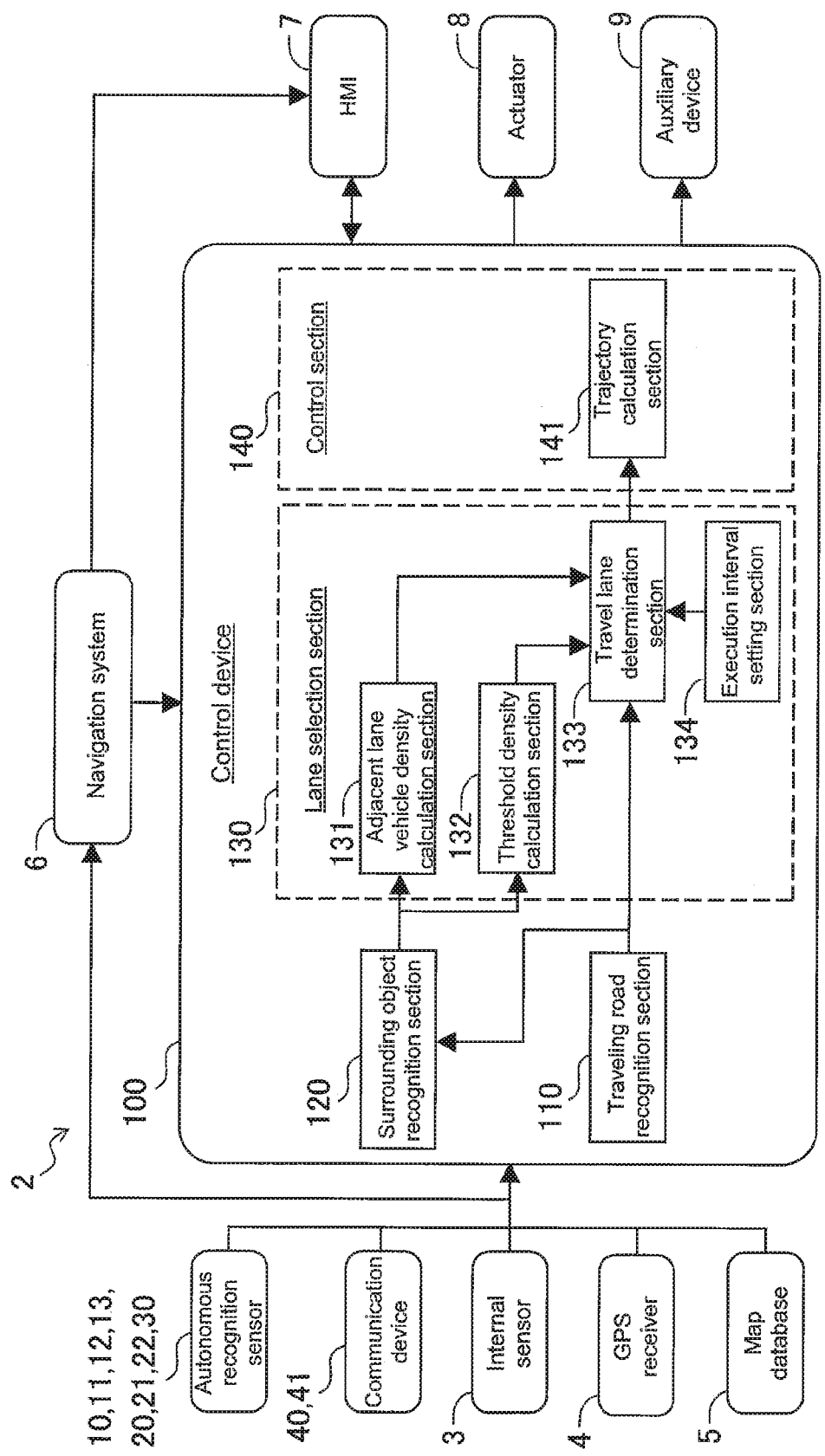
FIG. 2 is a block diagram illustrating a configuration of a control system of the autonomous driving vehicle according to the first embodiment.

Next, a configuration of a control system that is mounted on the autonomous driving vehicle of the present embodiment will be described with use of FIG. 2. As illustrated in FIG. 2, a control system 2 includes an internal sensor 3, a GPS (Global Positioning System) receiver 4, a map database 5, a navigation system 6, an HMI (Human Machine Interface) 7, an actuator 8 and an auxiliary device 9, in addition to the control device 100, autonomous recognition sensors 10 to 13, 20 to 22 and 30, and the communication devices 40 and 41 described above.

The internal sensor 3 includes at least one of a vehicle speed sensor, an acceleration sensor and a yaw rate sensor, for example. By these sensors, information concerning a traveling state of the own vehicle is obtained. Further, the internal sensor 3 includes a steering sensor in order to obtain information concerning a steering operation by a driver. The internal sensor 3 outputs the acquired information to the control device 100.

The GPS receiver 4 acquires positional information indicating a position of the own vehicle based on a signal transmitted by a GPS satellite. The GPS receiver 4 outputs the positional information of the own vehicle to the control device 100.

The map database 5 is formed in a storage such as an HDD and an SSD mounted on the vehicle, for example. Map information which the map database 5 has includes, for example, positional information of roads, information on road shapes, positional information of intersections and branch points, lane information of roads and the like. Note that the map database 5 may be stored in a server on the Internet that is communicable by the mobile communication device 41.

The navigation system 6 is a device that performs guidance to a destination that is set on the map by the driver to the driver. The navigation system 6 calculates a route on which the own vehicle travels, based on the positional information of the own vehicle which is measured by the GPS receiver 4 and the map information in the map database 5. The navigation system 6 transmits information on a calculated route to the driver via the HMI 7, and outputs the information on the calculated route to the control device 100. Note that a part of processing that is performed by the navigation system 6 may be performed by a server on the Internet that is communicable by the mobile communication device 41.

The HMI 7 is an interface for outputting and inputting information to and from an occupant and the control system 2. The HMI 7 includes, for example, a display for displaying image information to the occupant, a speaker for audio output, a touch panel for the occupant to perform an input operation and the like.

The actuator 8 is a device that operates in response to an operation signal from the control device 100, and changes the traveling state of the vehicle by the operation. The actuator 8 is provided at each of a drive system, a braking system, and a steering system, for example. The auxiliary device 9 is a generic name for devices that are not included in the actuator 8, and includes, for example, a direction indicator lamp, a headlight and the like.

The control device 100 is an ECU (Electronic Control Unit) having at least one CPU, at least one ROM, and at least one RAM. In the ROM, various programs for autonomous driving and various data including maps are stored. The program stored in the ROM is loaded on the RAM and is executed by the CPU, whereby various functions are realized by the control device 100. Note that the control device 100 may be configured by a plurality of ECUs.

1-3. Functions for Autonomous Driving of Control Device

In FIG. 2, functions relating to lane change of the own vehicle is specially expressed by blocks, out of the functions for autonomous driving which the control device 100 has. Illustration of the other functions for autonomous driving which the control device 100 has is omitted.

The control device 100 has a function of selecting a lane on which the own vehicle should travel from a plurality of lanes when the own vehicle travels on a road having a plurality of lanes, and executing autonomous lane change to the selected lane. The function is realized by a traveling road recognition section 110, a surrounding object recognition section 120, a lane selection section 130 and a control section 140 that are included by the control device 100. Note that these sections 110, 120, 130 and 140 do not exist as hardware in the control device 100, but are realized by software when the program stored in the ROM is executed by the CPU.

The traveling road recognition section 110 recognizes a traveling road on which the own vehicle is traveling. A road on which the own vehicle is traveling is a road having a plurality of lanes, the traveling road recognition section 110 also performs recognition of a lane on which the own vehicle is traveling. As methods for recognizing a traveling road by the traveling road recognition section 110, there are at least two methods as follows. A first method is a method that performs traveling road recognition based on map information concerning the road on which the own vehicle is traveling and positional information of the own vehicle. The map information is acquired from the map database 5. The positional information of the own vehicle is acquired from the GPS receiver 4. A second method is a method that extracts traffic lane lines (a white line, a yellow line, a median strip and the like) of a road by processing image pickup information acquired from the camera 30, and performs traveling road recognition based on the traffic lane lines. Either one of the traveling road recognition using the map information and the positional information, and the road recognition using the image pickup information may be used, or both of them may be used in combination. The traveling road recognition section 110 outputs the information concerning the recognized traveling road to the surrounding object recognition section 120 and the lane selection section 130.

The surrounding object recognition section 120 recognizes objects existing around the own vehicle. In recognition of surrounding objects, information acquired from the autonomous recognition sensors 10 to 13, 20 to 22 and 30 is used. The surrounding object recognition section 120 is capable of recognizing surrounding objects by at least one method of using the information of the LIDARs 10 to 13, using the information of the radars 20 to 22, using the information of the camera 30, and using information of a plurality of kinds of autonomous recognition sensors in combination by sensor fusion. The recognized surrounding objects include movable objects such as other vehicles and pedestrians, and stationary objects such as corner stones, guard rails, buildings and trees. Note that the other vehicles mentioned here also include a motor cycle if the motor cycle is traveling on the same lane with automobiles.

The surrounding object recognition section 120 acquires information concerning the traveling road recognized by the traveling road recognition section 110. When the road on which the own vehicle is traveling is a road having a plurality of lanes, the information acquired from the road recognition section 110 also includes the information concerning a traveling lane. The surrounding object recognition section 120 discriminates other vehicles traveling on an own lane (a lane on which the own vehicle is traveling), and other vehicles traveling on an adjacent lane that is adjacent to the own lane, from the recognized surrounding objects, by using the information concerning the traveling road. The surrounding object recognition section 120 outputs positions and speeds of the other vehicles traveling on the own lane, and positions and speeds of the other vehicles traveling on the adjacent lane to the lane selection section 130 as recognition information. Note that the information concerning the positions and speeds of the other vehicles traveling on the adjacent lane corresponds to "information concerning an empty space situation of the adjacent lane". Consequently, a function of the surrounding object recognition section 120 includes a function as an information acquisition section that is specified in the claims of the present application.

The lane selection section 130 executes lane selection determination processing of selecting a lane on which the own vehicle travels at predetermined execution intervals, based on the recognition information that is inputted from the road recognition section 110 and the surrounding object recognition section 120 respectively. In detail, in the lane selection determination processing, whether to keep a present own vehicle traveling lane, or to perform lane change to the adjacent lane is selected. In order to realize this function, the lane selection section 130 includes an adjacent lane vehicle density calculation section 131, a threshold density calculation section 132, a travel lane determination section 133, and an execution interval setting section 134.

The adjacent lane vehicle density calculation section 131 acquires recognition information on surrounding objects that is inputted to the lane selection section 130 from the surrounding object recognition section 120. The recognition information on the surrounding objects includes positions and speeds of the other vehicles traveling on the adjacent lane. The adjacent lane vehicle density calculation section 131 calculates a vehicle density in the adjacent lane based on the positions and the speeds of the other vehicles traveling on the adjacent lane. Here, the vehicle density in the adjacent lane is defined as the number of the other vehicles which are present per unit distance in the adjacent lane. The vehicle density in the adjacent lane is one of parameters indicating the empty space situation of the adjacent lane. The adjacent lane vehicle density calculation section 131 updates a calculation value of the vehicle density in the adjacent lane at predetermined periods. Details of a calculation method of the vehicle density by the adjacent lane vehicle density calculation section 131 will be described later.

The threshold density calculation section 132 calculates a threshold density to the vehicle density in the adjacent lane which is calculated by the adjacent lane vehicle density calculation section 131. The threshold density is an evaluation reference for evaluating whether the vehicle density in the adjacent lane is high or low, and is a selection reference for determining whether to select the adjacent lane as the own vehicle travel lane. The threshold density calculation section 132 acquires recognition information of surrounding objects that is inputted to the lane selection section 130 from the surrounding object recognition section 120, and calculates the threshold density in accordance with relations between the own vehicle and surrounding vehicles that are determined based on the recognition information of the surrounding objects. The threshold density calculation section 132 updates a calculation value of the threshold density at periods that are set in advance. Details of the calculation method of the threshold density by the threshold density calculation section 132 will be described later.

The travel lane determination section 133 determines a travel lane based on comparison of the vehicle density in the adjacent lane calculated by the adjacent lane vehicle density calculation section 131 and the threshold density calculated by the threshold density calculation section 132. In determination of the travel lane, either one of keeping a present own vehicle travel lane or changing the own vehicle travel lane to the adjacent lane is selected. The travel lane determination section 133 outputs information concerning the determined travel lane to the control section 140. Details of the determination method of the travel lane by the travel lane determination section 133 will be described later.

The execution interval setting section 134 sets an execution interval of the lane selection determination processing that is performed by the lane selection section 130. The execution interval of the lane selection determination processing may be set by a time, or may be set by a travel distance. In autonomous driving vehicles which are mass-produced, in a case where the same function is mounted on the respective vehicles, a common value among the vehicles is often set as the parameter relating to the function. The execution interval set by the execution interval setting section 134 is one parameter for the autonomous lane selection function that is commonly mounted on the autonomous driving vehicles. However, as the execution interval set by the execution interval setting section 134, a common value is not set to all of the autonomous driving vehicle, but the execution interval is set with variation among the autonomous driving vehicles. The details of the setting method of the execution interval by the execution interval setting section 134 will be described later.

The control section 140 controls travel of the own vehicle based on information that is inputted from the lane selection section 130. Control by the control section 140 includes two modes as follows, for example. According to a first mode, lane change to the adjacent lane is performed autonomously when performing lane change to the adjacent lane is selected by the lane selection section 130. According to a second mode, proposal of lane change to the adjacent lane to the driver is performed via the HMI 7, when performing lane change to the adjacent lane is selected by the lane selection section 130. When control is performed in the second mode, the control section 140 performs lane change to the adjacent lane autonomously when the driver agrees to the proposal, and when the driver does not agree to the proposal, the control section 140 may keep the present own vehicle travel lane. In order to realize the function like this, the lane selection section 130 includes a trajectory calculation section 141 that calculates a trajectory that should be followed by the own vehicle.

The trajectory calculation section 141 calculates a target trajectory based on information concerning the travel lane which is inputted from the travel lane determination section 133. When keeping the present own vehicle travel lane is selected by the travel lane determination section 133, the trajectory calculation section 141 calculates a target trajectory along the present own vehicle travel lane. When changing the own vehicle travel lane to the adjacent lane is selected by the travel lane determination section 133, the trajectory calculation section 141 calculates a target trajectory in which the own vehicle is moved to the adjacent lane from the present own vehicle travel lane. Concerning each of lane keeping and lane change, the method for trajectory calculation is not limited. The control section 140 calculates an operation amount of the actuator 8 of at least one of the drive system, the braking system and the steering system based on the target trajectory calculated in the trajectory calculation section 141. The control section 140 operates the actuator 8 in accordance with the calculated operation amount, and thereby controls travel of the own vehicle.

1-4. Details of Calculation Method of Vehicle Density

Figure 3:
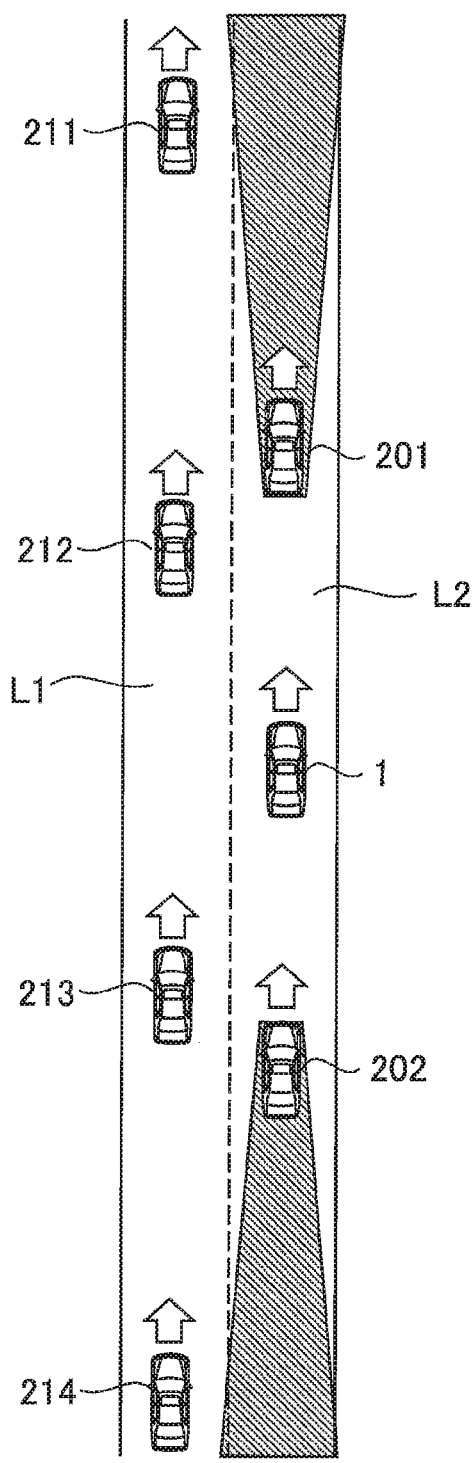
FIG. 3 is a view for explaining surrounding object recognition by the control system of the autonomous driving vehicle according to the first embodiment.

Details of the calculation method of the vehicle density by the adjacent lane vehicle density calculation section 131 will be described with use of FIG. 3. FIG. 3 illustrates a state in which the own vehicle 1 travels on a second lane L2 in a road having a first lane L1 and the second lane L2. During traveling of the own vehicle 1, other vehicles which are present around the own vehicle 1 are recognized by the autonomous recognition sensors 10 to 13, 20 to 22 and 30 (refer to FIG. 1) included by the own vehicle 1.

In an example illustrated in FIG. 3, a preceding vehicle 201 and a following vehicle 202 that travel on an own lane (the second lane) L2 are recognized. Other vehicles may be present respectively ahead of the preceding vehicle 201 and behind the following vehicle 202, but these vehicles are in blind spots (regions illustrated by oblique lines in FIG. 3) of the autonomous recognition sensors, and therefore it is difficult for the autonomous recognition sensors to recognize these vehicles. On the adjacent lane (the first lane) L1, vehicles which are present in a range of approximately 100 to 200 m in front and rear of the own vehicle 1 are recognized, although it depends on ranges of the blind spots of the autonomous recognition sensors. In the example illustrated in FIG. 3, four vehicles 211, 212, 213 and 214 that travel on the adjacent lane L1 are recognized.

The adjacent lane vehicle density calculation section 131 calculates the vehicle density in the adjacent lane L1 from positional information of continuous three vehicles or more that travel on the adjacent lane L1. Specifically, when N (>3) vehicles are located on the adjacent lane L1, the spaces among the vehicles that travel one behind another are acquired respectively, and thereby N−1 (>2) of inter-vehicle distances can be defined. The adjacent lane vehicle density calculation section 131 calculates a representative value of N−1 of inter-vehicle distances, takes an inverse value of the representative value, and thereby calculates the number of vehicles present per unit distance of the adjacent lane L1, that is, the vehicle density in the adjacent lane L1. In the example illustrated in FIG. 3, the representative value of the inter-vehicle distances is calculated based on an inter-vehicle distance between the vehicle 211 and the vehicle 212, an inter-vehicle distance between the vehicle 212 and the vehicle 213, and an inter-vehicle distance between the vehicle 213 and the vehicle 214. As the calculation method of the representative value of the inter-vehicle distances, for example, taking a statistic average value of the respective inter-vehicle distances, taking a medium value and the like are cited. Further, taking the average value after assigning weights to the respective inter-vehicle distances, and taking the average value after excluding inter-vehicle distances of a threshold value or more may be adopted. Further, the representative value may be defined by a function with the respective inter-vehicle distances as arguments. Note that when the number of vehicles traveling in the range which is recognizable by the autonomous recognition sensors is two or less, the adjacent lane vehicle density calculation section 131 outputs a minimum value that is set in advance as the vehicle density of the adjacent lane L1.

1-5. Details of Calculation Method of Threshold Density

In the present embodiment, the threshold density calculation section 132 acquires a relative speed to the own vehicle, of other vehicles traveling in the adjacent lane that is included in the recognition information of surrounding objects. In the example illustrated in FIG. 3, in a case where a traveling speed of the own vehicle 1 is lower than traveling speeds of other vehicles traveling on the adjacent lane, a relative speed may be calculated from a difference between an average speed of the plurality of vehicles 211 and 212 that pass the own vehicle 1 and the traveling speed of the own vehicle 1. Further, when the traveling speed of the own vehicle 1 is higher than the traveling speeds of other vehicles traveling on the adjacent lane, a relative speed may be calculated from a difference between an average speed of the plurality of vehicles 213 and 214 which the own vehicle 1 passes and the traveling speed of the own vehicle 1.

Figure 4:
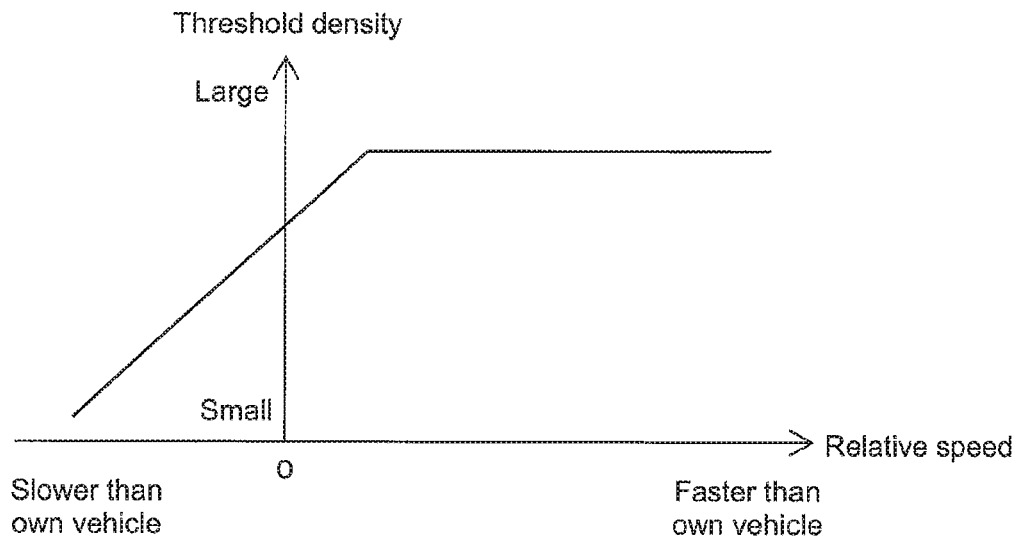
FIG. 4 is a diagram for explaining a calculation method of a threshold density according to the first embodiment.

The threshold density calculation section 132 calculates a threshold density from the relative speed, by using a map in which a relation illustrated in FIG. 4 is specified. According to the map, as the traveling speed of the other vehicles traveling in the adjacent lane is lower than the traveling speed of the own vehicle, the threshold density is set at a smaller value. Further, as the relative speed becomes higher, the threshold density is set at a larger value, and at a relative speed equal to or higher than a fixed speed, the threshold density is set at substantially the same density. The threshold density is an evaluation reference for evaluating whether the vehicle density in the adjacent lane is high or low. Therefore, according to setting of the threshold density shown in the map, when a flow speed in the adjacent lane is lower than a flow speed in the own lane, the vehicle density in the adjacent lane tends to be evaluated as relatively high. On the other hand, when the flow speed in the adjacent lane is higher than the flow speed in the own lane, the vehicle density in the adjacent lane tends to be evaluated as relatively low.

1-6. Details of Determination Method of Travel Lane

The travel lane determination section 133 compares the vehicle density in the adjacent lane which is calculated in the adjacent lane vehicle density calculation section 131, and the threshold density which is calculated in the threshold density calculation section 132. When the vehicle density in the adjacent lane is higher than the threshold density, the merit of changing the own vehicle travel lane to the adjacent lane is small. However, if the vehicle density in the adjacent lane is lower than the threshold density, a traffic flow can be dispersed between at least two adjacent lanes by changing the own vehicle travel lane to the adjacent lane. Consequently, the travel lane determination section 133 selects to change the own vehicle travel lane to the adjacent lane when the vehicle density in the adjacent lane is lower than the threshold density, and selects to keep the present own vehicle travel lane when the vehicle density in the adjacent lane is the threshold density or more.

1-7. Details of Setting Method of Execution Interval

Figure 5:
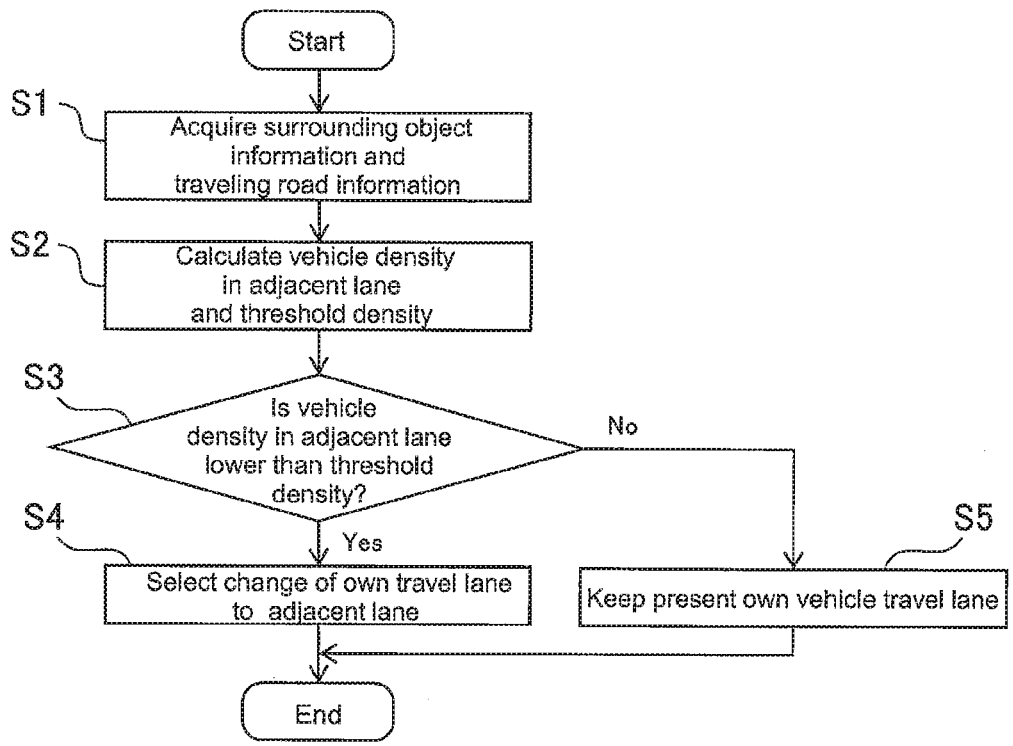
FIG. 5 is a flowchart illustrating a process of lane selection determination processing according to the first embodiment.

Here, FIG. 5 is a flowchart illustrating a process of the lane selection determination processing by the lane selection section 130. The lane selection section 130 repeatedly carries out the processing illustrated in the flowchart at predetermined execution intervals. First, in step S1, the lane selection section 130 acquires the surrounding object information and the traveling road information from the surrounding object recognition section 120 and the traveling road recognition section 110. In step S2, the lane selection section 130 calculates the vehicle density in the adjacent lane and the threshold density based on the surrounding object information and the traveling road information which are acquired in step S1 respectively. Subsequently, in step S3, the lane selection section 130 compares the vehicle density and the threshold density which are calculated in step S2, and determines whether the vehicle density in the adjacent lane is lower than the threshold density. When the vehicle density in the adjacent lane is lower than the threshold density, the lane selection section 130 selects change of the own travel lane to the adjacent lane in step S4. When the vehicle density in the adjacent lane is the threshold density or more, the lane selection section 130 selects to keep the present own vehicle travel lane in step S5.

The execution interval of the lane selection determination processing can be any interval if only there is variation among the vehicles. However, as the execution interval, a minimum value and a maximum value as follows may be set. The minimum value in the case of the execution interval being set by a time is approximately 100 ms, for example. This is a time on an assumption that as soon as an empty space is found in the adjacent lane, lane change is started. A maximum value in a case of the execution interval being set by a time is approximately 60 s, for example. This is a time on an assumption that lane selection is determined after waiting until actions of other neighboring vehicles to the empty space on the adjacent lane end.

The minimum value in the case of the execution interval being set by a travel distance is, for example, approximately 2 m. This is a distance in a case of traveling for a time period of approximately 100 ms at 72 km/hr which is assumed as a traveling speed on a main lane. On the other hand, the maximum value in the case of the execution interval being set by a travel distance is, for example, approximately 200 m. This is a distance in a case of traveling for a time period of approximately 60 s at 100 km/hr which is assumed as a traveling speed on a main lane.

A method for giving variation to the execution interval of the lane selection determination processing among the vehicles is as follows, for example. A first method is to give a random value to the execution period at a time of shipment of a vehicle from a factory, or at a time of installment of the vehicle to a garage of a dealer. A second method is giving a random value to the execution interval at a time of start of the engine, that is, at a time of turning on a power supply. A third method is giving a random value to the execution interval based on a communication content by communicating with a server on the Internet via the mobile communication device 41. According to the first method, the execution interval is fixed in each of the vehicles, whereas according to the second method and the third method, the execution interval is updated regularly or irregularly.

Incidentally, when the execution interval of the lane selection determination processing changes at each time in one vehicle, a response time period of lane change to the change of the empty space situation of the adjacent lane differs at each time. There is the fear that variation in the response time is unsuitable to sense of an occupant and the occupant feels a sense of discomfort. When attention is paid to a single vehicle, if lane change is performed with a substantially fixed response time period, the occupant can be restrained from feeling a sense of discomfort. As a method for this, determining a set value of the execution interval based on input of the driver is cited, for example. More specifically, a fourth to a seventh methods as follows are cited.

A fourth method is to provide a switch for changing the execution interval at random in the vehicle, and change the execution interval at random each time the driver presses the switch. The switch is included in the HMI 7. A fifth method is to cause the driver to input the execution period itself. For example, setting switches for short, middle and long are provided as one of the HMIs 7, and the execution interval may be changed in accordance with operations of the respective switches.

A sixth method is to set the execution interval in accordance with a remaining distance to a destination which is set by the driver with the navigation system 6. For example, when a distance to the destination from a travel start spot is long, it is desirable to enable the own vehicle to cruise smoothly. Therefore, in this case, the execution interval is set to be short so that lane change is positively made to the lane where the vehicle density is low. Conversely, when the distance to the destination from the travel start spot is short, it is desirable to suppress a frequency of lane change to be low even by allowing congestion around the own vehicle. Therefore, in this case, the execution interval is set to be long so that lane change to a lane where the vehicle density is low becomes negative. The execution interval may be set in accordance with a distance to the destination from a present spot instead of the distance to the destination from the travel start spot.

A seventh method is to set the execution interval in accordance with a vehicle speed which is set to an auto cruise device by the driver. For example, when the set vehicle speed is large, it is desirable to enable the own vehicle to cruise smoothly. Therefore, in this case, the execution interval is set to be short so that lane change is positively performed to the lane where the vehicle density is low. Conversely, when the set vehicle speed is low, it is desirable to suppress the frequency of lane change to be low even by allowing congestion around the own vehicle. Therefore, in this case, the execution interval is set to be long so that lane change to the lane where the vehicle density is low becomes negative. Note that the execution interval may be set in accordance with the difference between the set vehicle speed and the present vehicle speed, instead of the set vehicle speed.

As the method for giving variation to the execution interval of the lane selection determination processing among the vehicles, the set value of the execution interval may be changed each time the lane selection determination processing is executed. More specifically, an eighth and a ninth methods as follows are cited. The eighth method is to change the execution interval at random in accordance with a number of execution times of the lane selection determination processing. The ninth method is to set the execution interval by using a value that changes in accordance with a time such as the remaining distance to the destination, a time period from the travel start. According to these methods, a probability of a plurality of vehicles with the execution intervals of the lane selection determination processing being close to one another traveling one behind another on the same lane is suppressed to be low.

1-8. Example of Operation of Autonomous Driving Vehicle According to Autonomous Driving System Specific operations of the autonomous driving vehicles by the autonomous driving system configured as above will be described with a comparative example. The comparative example is operations of autonomous driving vehicles by an autonomous driving system to which the present disclosure is not applied. FIGS. 6A to 6D illustrate an example of the operations of the autonomous driving vehicles by the autonomous driving system of the comparative example, and FIGS. 7A to 7D illustrate an example of the operations of the autonomous driving vehicles by the autonomous driving system according to the present embodiment.

Figure 6A:
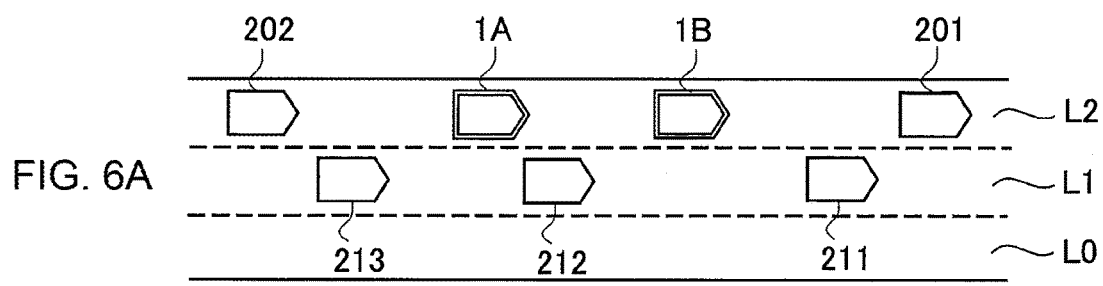
FIG. 6A is a diagram illustrating an example of operations of autonomous driving vehicles by an autonomous driving system to which the present disclosure is not applied.

In each of FIGS. 6A and 7A, a state is drawn, in which a plurality of vehicles 1A, 1B, 201 and 202 including autonomous driving vehicles 1A and 1B travel on a lane L2 at a left side (an upper side in the drawing) toward a traveling direction, and a plurality of vehicles 211, 212 and 213 are also present on a central lane L1 that is an adjacent lane that is adjacent to the lane L2. Here, it is assumed that a vehicle density in the lane L2 is lower than a vehicle density in the lane L1, and therefore the autonomous driving vehicles 1A and 1B keep the lane L2.

Figure 6B:
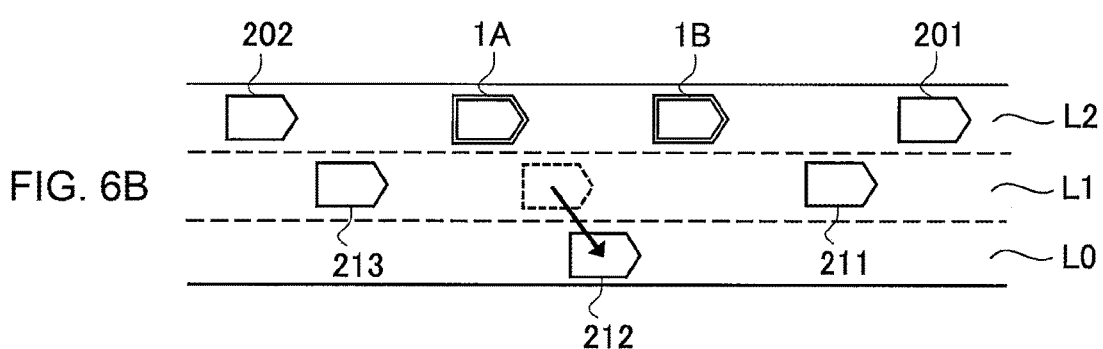
FIG. 6B is a diagram illustrating an example of operations of autonomous driving vehicles by an autonomous driving system to which the present disclosure is not applied.

In each of FIGS. 6B and 7B, a state is drawn, in which the vehicle 212 near the autonomous driving vehicles 1A and 1B, which travels in the central lane L1, moves to a lane L0 at a right side (lower sides in the drawings) toward a traveling direction. Here, it is assumed that a vehicle density in the central lane L1 becomes lower than the threshold density by the vehicle 212 making lane change.

Figure 6C:
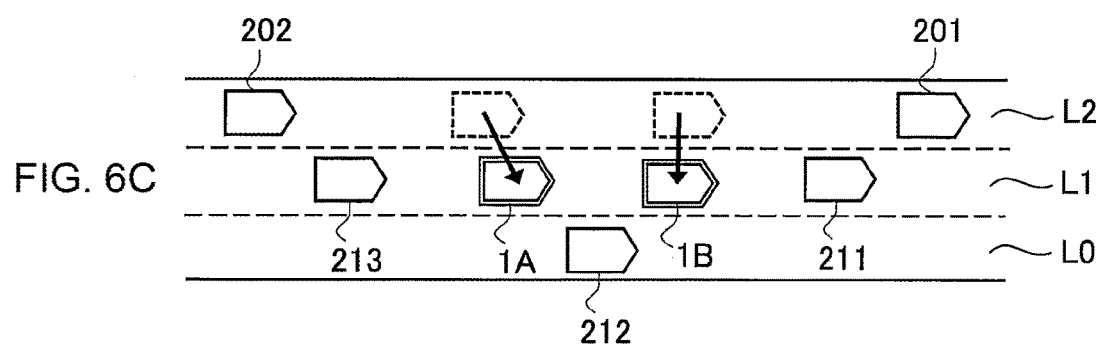
FIG. 6C is a diagram illustrating an example of operations of autonomous driving vehicles by an autonomous driving system to which the present disclosure is not applied.

In the case of the comparative example to which the present disclosure is not applied, the aforementioned lane selection determination processing is executed at the same execution intervals in both of the autonomous driving vehicles 1A and 1B. Meanwhile, in the autonomous driving system according to the present embodiment, the execution interval set in the autonomous driving vehicle 1A is assumed to be longer than the execution interval set in the autonomous driving vehicle 1B. However, in both the examples, there may be the case where timings for the lane selection determination processing happen to correspond to each other in the autonomous driving vehicles 1A and 1B. In this case, as illustrated in FIG. 6C and FIG. 7C, the two autonomous driving vehicles 1A and 1B move to the central lane L1 at the same time.

Figure 6D:
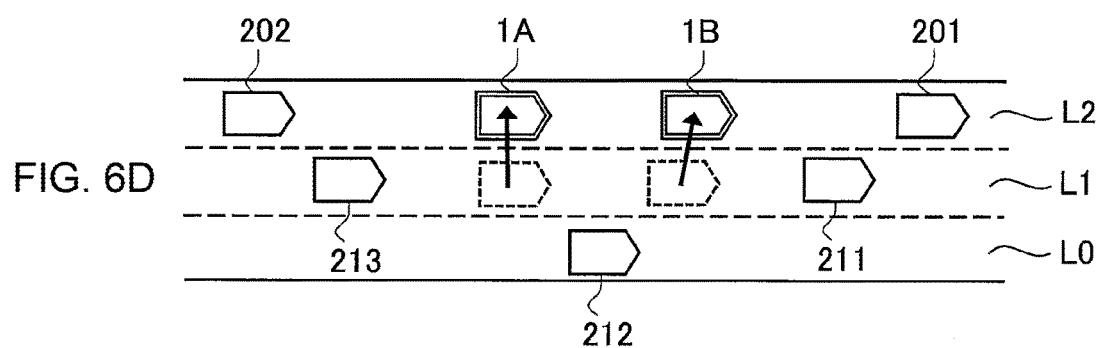
FIG. 6D is a diagram illustrating an example of operations of autonomous driving vehicles by an autonomous driving system to which the present disclosure is not applied.

It is assumed that as a result of the two autonomous driving vehicles 1A and 1B making lane change at the same time, the vehicle density in the left lane L2 is relatively reduced and becomes lower than the threshold density. Further, though not drawn in the drawings, it is assumed that a larger number of vehicles are traveling on the right lane L0 than on the central lane L1, and the vehicle density in the right lane L0 is higher than the threshold density. In this case, in the comparative example, the timings for the lane selection determination processing coincide with each other again between the autonomous driving vehicles 1A and 1B, so that as illustrated in FIG. 6D, the two autonomous driving vehicles 1A and 1B move to the left lane L2 again at the same time. Thereafter, in the comparative example, the two autonomous driving vehicles 1A and 1B repeat moving to the central lane L1 from the left lane L2 at the same time, and moving to the left lane L2 from the central lane L1 immediately thereafter. That is, in the comparative example, hunting of lane change occurs.

Meanwhile, in the case of the autonomous driving system according to the present embodiment, there is a difference in execution interval of the lane selection determination processing between the autonomous driving vehicles 1A and 1B, and therefore even if the timings for determination happen to correspond to each other, next timings for determination do not correspond to each other. Consequently, as illustrated in FIG. 7D, the autonomous driving vehicle 1B in which the execution interval of the lane selection determination processing is short moves to the left lane L2 from the central lane L1 first. The autonomous driving vehicle 1B makes lane change, and thereby the vehicle density in the left lane L2 becomes high. As a result, the vehicle density in the left lane L2 may be higher than the threshold density. In this case, the autonomous driving vehicle 1A does not select to move to the left lane L2, but selects to keep the central lane L1. Thereby, the autonomous driving vehicle 1A and the autonomous driving vehicle 1B travel on the separate lanes, and an imbalance of the vehicle density among the lanes is reduced.

As is known from the above example, according to the autonomous driving system according to the present embodiment, a plurality of vehicles are restrained from making lane change to the adjacent lane at the same time, so that occurrence of hunting of lane change is avoided, and a smooth traffic flow can be realized.

1-9. Modification Example of First Embodiment

In the threshold density calculation section 132, the vehicle density in the own lane may be acquired, and the threshold density may be calculated based on the vehicle density of the own lane. However, the vehicles except for the nearest preceding vehicle and following vehicle among the vehicles traveling on the own lane are in the blind spots of the autonomous recognition sensors, and therefore are difficult to recognize. Consequently, there will be introduced methods except for the method for calculating the vehicle density in the own lane from the recognition results by the autonomous recognition sensors, here.

A first method for acquiring the vehicle density in the own lane is to estimate the vehicle density in the own lane from information that is correlated with the vehicle density. The information correlated with the vehicle density is a relation between a standard traveling speed on the road where the vehicle is traveling, and an actual traveling speed of the vehicle. Specifically, when a situation where the vehicle is traveling at the standard traveling speed and a situation where the vehicle is traveling at a lower speed than the standard traveling speed are compared, the vehicle density in the latter situation tends to be higher than the vehicle density in the former situation. Further, when a road in which the standard traveling speed is high and a road in which the standard traveling speed is low are compared, a vehicle density in the latter road tends to be higher than a vehicle density in the former road. Consequently, if the traveling speed of the vehicle traveling on the own lane and the standard traveling speed of the own lane are found, the vehicle density of the own lane can be estimated based on the traveling speed of the vehicle and the standard traveling speed.

A second method for acquiring the vehicle density in the own lane is to use a calculation result of the vehicle density in the adjacent lane. First, when the own vehicle is traveling on a certain lane, the vehicle density in the adjacent lane is stored in the memory, and is updated at predetermined periods. When lane change to the adjacent lane is performed, the vehicle density in the adjacent lane which is stored in the memory at that point of time is read, and is stored in another region of the memory as the vehicle density in the own lane. The vehicle density in the own lane which is stored is held until lane change is performed again. By performing processing like this, the vehicle density in the adjacent lane can be used as the vehicle density in the own lane.

A third method for acquiring the vehicle density in the own lane is to calculate the vehicle density in the own lane by using the road traffic information that is received by the road-vehicle communication device 40. The infrastructure equipment such as a road traffic information communication system collects positional information of the vehicles traveling on the road and transmits the positional information as road traffic information. Consequently, the road traffic information acquired by the road-vehicle communication device 40 includes at least rough positional information of other vehicles on the road where the own vehicle is traveling. By using the information, the vehicle density in the own lane can be calculated. Further, by using the information, the vehicle density in the adjacent lane can be also calculated.

A fourth method for acquiring the vehicle density in the own lane is to acquire the vehicle density in the own lane from a server on the Internet by the mobile communication device 41. The recognition information obtained by the autonomous recognition sensors of the respective vehicles, and the recognition information obtained by the recognition devices installed on the road are collected in the server on the Internet. The server processes the collected information, and calculates the vehicle density in each lane on each road. By receiving the vehicle density in each lane on the road where the own vehicle is traveling from the server, the vehicle density in the own lane can be acquired. Further, the vehicle densities on the adjacent lanes also can be acquired at the same time.

Second Embodiment

Figure 8:
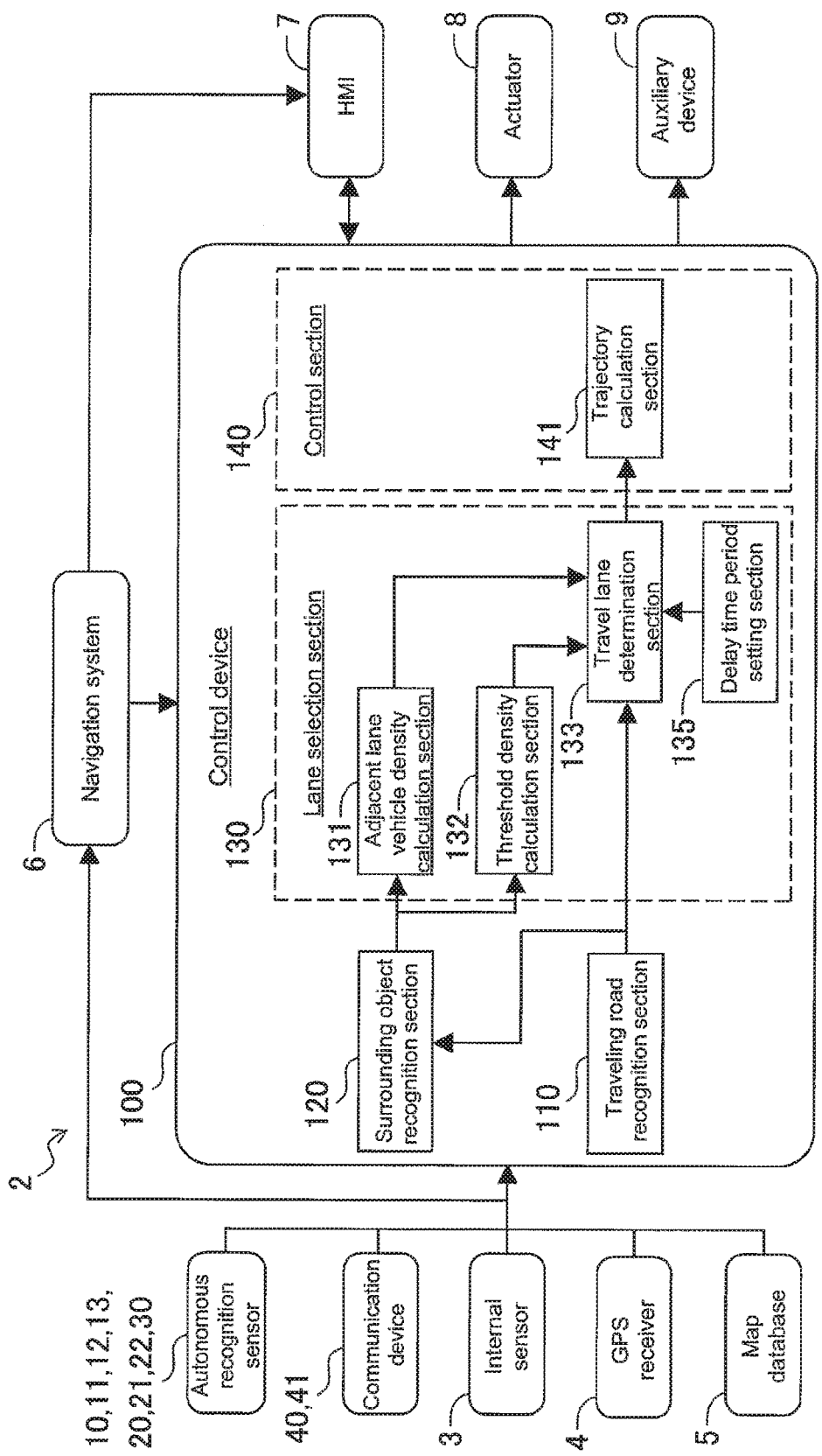
FIG. 8 is a block diagram illustrating a configuration of a control system of an autonomous driving vehicle according to a second embodiment.

An autonomous driving system according to the present embodiment is a traffic system that is constructed by a plurality of autonomous driving vehicles having the same function, for example, the autonomous driving vehicle 1 illustrated in FIG. 1, as in the autonomous driving system according to the first embodiment. The autonomous driving system according to the present embodiment has a difference from the autonomous driving system according to the first embodiment in configuration of the control system that is mounted on the autonomous driving vehicle. FIG. 8 is a block diagram illustrating a configuration of the control system for an autonomous driving vehicle according to the present embodiment. In FIG. 8, functions relating to lane change of an own vehicle are specially expressed in blocks, among functions for autonomous driving which the control device 100 has. Note that in FIG. 8, as for functions common to the functions of the control device 100 according to the first embodiment, common reference signs are assigned to the blocks.

The lane selection section 130 in the control device 100 according to the present embodiment outputs an lane change instruction to the control section 140 when selecting lane change to an adjacent lane in the lane selection determination processing. The control section 140 receives input of the lane change instruction from the lane selection section 130, and automatically performs lane change to the adjacent lane, or proposes lane change to the adjacent lane to a driver. In the present embodiment, a delay time period is provided in a period until the lane selection section 130 outputs a lane change instruction after executing the lane selection determination processing.

The lane selection section 130 of the control device 100 according to the present embodiment includes a delay time period setting section 135 instead of the execution interval setting section 134 (refer to FIG. 2) included by the lane selection section 130 according to the first embodiment. In the present embodiment, the lane selection determination processing is always performed repeatedly at short execution intervals. The delay time period is a longer time period as compared with the execution interval of the lane selection determination processing (an interval time period at the time of being converted into a time, when the execution interval is set by a distance). The delay time period setting section 135 sets a delay time period in a period until output of the lane change instruction from execution of the lane selection determination processing. However, as the delay time period that is set by the delay time period setting section 135, a common value is not set to all of the autonomous driving vehicles, but the delay time period is set with variation between the autonomous driving vehicles. Specifically, setting of the delay time period is performed for each of the vehicles by using similar methods as the setting methods of the execution interval (the first to ninth methods) described in the first embodiment.

Figure 9:
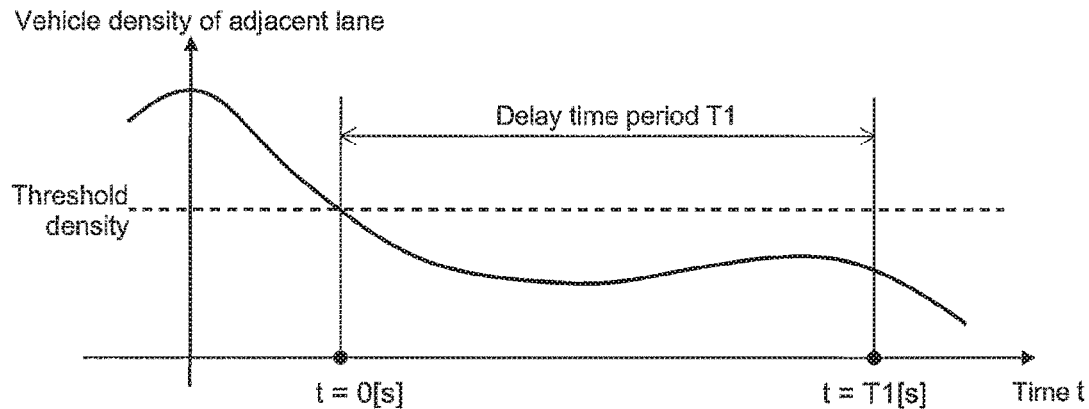
FIG. 9 is a diagram for explaining a delay time period in the control system of an autonomous driving vehicle according to the second embodiment.

FIG. 9 is a diagram for explaining the delay time period in the control system for an autonomous driving vehicle according to the present embodiment. In the lane selection section 130, the lane selection determination processing based on comparison of the vehicle density of the adjacent lane and the threshold density is repeatedly performed at short execution intervals. When the vehicle density of the adjacent lane becomes lower than the threshold density at a certain timing, the lane selection section 130 selects lane change to the adjacent lane. However, until a delay time period T1 that is set in the delay time period setting section 135 elapses from a time point at which determination of lane change is performed, the lane selection section 130 suspends output of the lane change instruction to the control section 140. Subsequently, at a time point when the delay time period T1 elapses, the lane change instruction is outputted to the control section 140 from the lane selection section 130.

When under the situation where two autonomous driving vehicles are traveling one behind another on the same lane, the vehicle density in the adjacent lane becomes lower than the threshold density, lane change to the adjacent lane is selected simultaneously in the two vehicles. However, the delay time period until the lane change instruction is outputted after the lane selection determination processing is executed is given variation between the autonomous driving vehicles. Therefore, it happens that lane change is immediately performed in one of the vehicles, whereas in the other vehicle, lane change is not immediately performed. That is, according to the autonomous driving system according to the present embodiment, a plurality of autonomous driving vehicles are restrained from making lane change to the adjacent lane at the same time.

Figure 10:
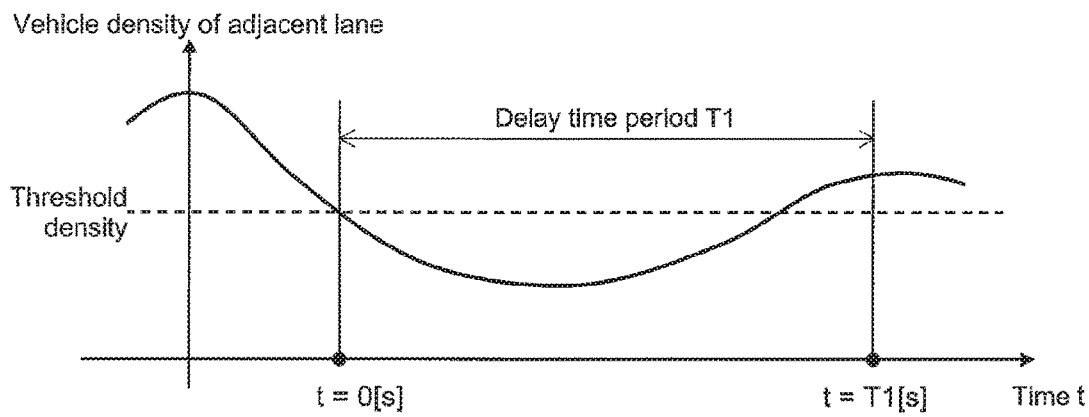
FIG. 10 is a diagram for explaining determination of lane selection by the control system of an autonomous driving vehicle according to the second embodiment.

Note that the vehicle density in the adjacent lane always changes in accordance with the situation of the vehicles traveling on the adjacent lane. Consequently, as illustrated in FIG. 10, the vehicle density in the adjacent lane may become higher than the threshold density again in a period until the delay time period elapses. In a case like this, the lane selection section 130 may cancel the suspended output of the lane change instruction to the control section 140. The vehicle density in the adjacent lane is not low any more, and therefore, by canceling the lane change, the vehicle density in the adjacent lane can be prevented from becoming higher.

Figure 11:
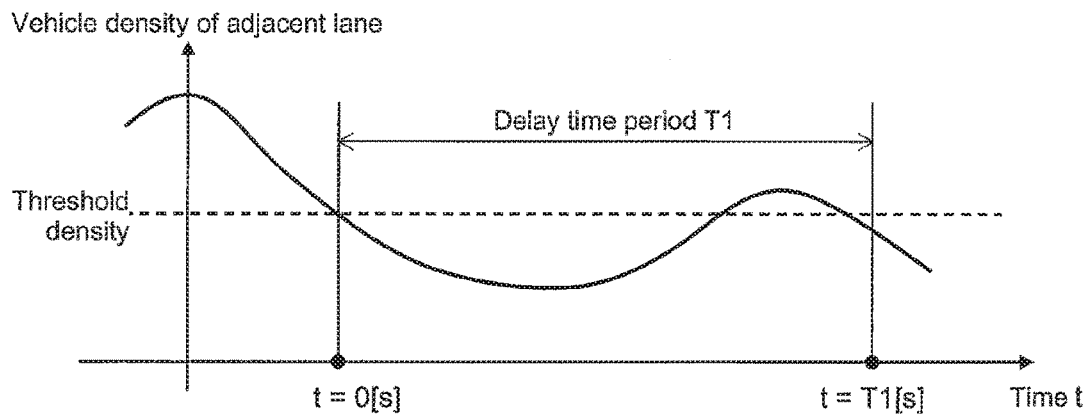
FIG. 11 is a diagram for explaining determination of lane selection by the control system of an autonomous driving vehicle according to the second embodiment.

Further, as illustrated in FIG. 11, there may be a case in which although the vehicle density in the adjacent lane becomes higher than the threshold density again in the period until the delay time period elapses, the vehicle density in the adjacent lane becomes lower than the threshold density at the time point when the delay time period elapses. In the case like this, the lane selection section 130 may output the suspended lane change instruction to the control section 140. In the examples illustrated in FIG. 10 and FIG. 11, it can happen that lane change is performed in a certain vehicle, whereas lane change is not performed in another vehicle depending on the set value of the delay time period. Thereby, a plurality of vehicles are effectively prevented from making lane change to the adjacent lane at the same time.

Third Embodiment

Figure 12:
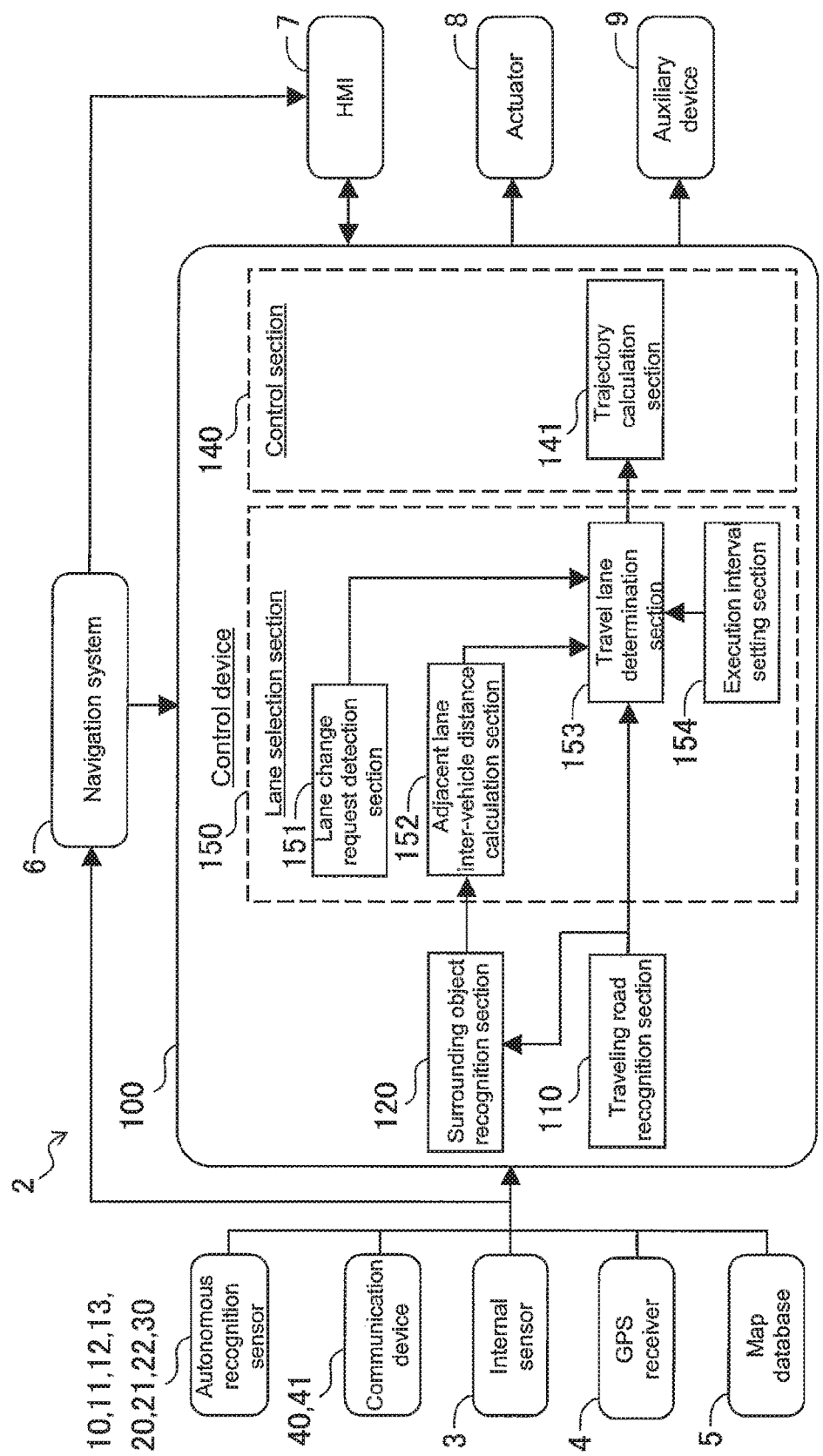
FIG. 12 is a block diagram illustrating a configuration of a control system of an autonomous driving vehicle according to a third embodiment.

An autonomous driving system according to the present embodiment is a traffic system that is constructed by a plurality of autonomous driving vehicles having the same function, for example, the autonomous driving vehicle 1 illustrated in FIG. 1, as in the autonomous driving system according to the first embodiment. FIG. 12 is a block diagram illustrating a configuration of the control system for an autonomous driving vehicle according to the present embodiment. In FIG. 12, functions relating to lane change of an own vehicle are specially expressed in blocks, among functions for autonomous driving which the control device 100 has. Note that in FIG. 12, as for functions common to the functions of the control device 100 according to the first embodiment, common reference signs are assigned to the blocks.

A control system of the autonomous driving vehicle according to the present embodiment has a function of autonomously performing lane change when detecting an empty space that enables lane change in an adjacent lane, when there is a request for lane change to the adjacent lane. The requests for lane change include a request by a driver, and a request generated inside the autonomous driving system. In order to realize the function like this, the control device 100 according to the present embodiment includes a lane selection section 150. Upon detecting the request for lane change, the lane selection section 150 executes lane selection determination processing of selecting a lane on which the own vehicle travels at predetermined execution intervals, based on the recognition information that is inputted from the road recognition section 110 and the surrounding object recognition section 120, respectively. The lane selection section 150 includes a lane change request detection section 151, an adjacent lane inter-vehicle distance calculation section 152, a travel lane determination section 153 and an execution interval setting section 154.

The lane change request detection section 151 detects a request for lane change that is inputted by a driver operating the HMI 7. Further, the lane change request detection section 151 detects a request for lane change based on a travel lane plan that is planned inside the autonomous driving system. When the request for lane change is detected, the lane change request detection section 151 outputs a signal that notifies that a request for lane change is present, to the travel lane determination section 153.

The adjacent lane inter-vehicle distance calculation section 152 acquires recognition information on surrounding objects that is inputted to the lane selection section 150 from the surrounding object recognition section 120. The recognition information of surrounding objects includes positions and speeds of other vehicles traveling on the adjacent lane. The adjacent lane inter-vehicle distance calculation section 152 calculates an inter-vehicle distance between each vehicle traveling on the adjacent lane and the preceding vehicle, based on positions and speeds of other vehicles traveling on the adjacent lane. The inter-vehicle distance in the adjacent lane is one of parameters indicating an empty space situation of the adjacent lane.

In the example illustrated in FIG. 3, the inter-vehicle distance between the vehicle 211 and the vehicle 212, the inter-vehicle distance between the vehicle 212 and the vehicle 213, and the inter-vehicle distance between the vehicle 213 and the vehicle 214 are calculated respectively. However, when the traveling speed of the other vehicles traveling on the adjacent lane is lower than the traveling speed of the own vehicle, only an inter-vehicle distance of the other vehicle traveling ahead of the own vehicle (in the example illustrated in FIG. 3, the inter-vehicle distance between the vehicle 211 and the vehicle 212) may be calculated. When the traveling speed of the other vehicles traveling on the adjacent lane is higher than the traveling speed of the own vehicle, only the inter-vehicle distance of the other vehicles traveling behind the own vehicle may (in the example illustrated in FIG. 3, the inter-vehicle distance between the vehicle 213 and the vehicle 214) be calculated. The adjacent lane vehicle density calculation section 131 updates calculation values of the inter-vehicle distances of the respective vehicles traveling on the adjacent lane at periods that are set in advance.

When the travel lane determination section 153 is notified that a request for lane change is present by the lane change request detection section 151, the travel lane determination section 153 compares the inter-vehicle distances of the respective vehicles calculated in the adjacent lane inter-vehicle distance calculation section 152 with the threshold distance. The threshold distance is an inter-vehicle distance into which the own vehicle moves safely, and is a selection reference for determining whether or not to select the adjacent lane as the own vehicle travel lane. The threshold distance may be set as a fixed value, or may be expressed by a function with a relative speed of the other vehicles traveling in the adjacent lane to the own vehicle as a variable. When the inter-vehicle distance in the adjacent lane is larger than the threshold distance, the travel lane determination section 153 selects to change the own vehicle travel lane to the adjacent lane, and when the inter-vehicle distance in the adjacent lane is the threshold distance or less, the travel lane determination section 153 selects to keep the present own vehicle travel lane.

The execution interval setting section 154 sets an execution interval of the lane selection determination processing which is performed by the lane selection section 150. The execution interval of the lane selection determination processing may be set by a time period, or may be set by a traveling distance. As for the execution interval which is set by the execution interval setting section 154, a value common to all of the autonomous driving vehicles is not set, but the execution interval is set with variation among the autonomous driving vehicles. Specifically, setting of the execution interval is performed for each of the vehicles by using methods similar to the setting methods (the first to ninth methods) of the execution interval, which is explained in the first embodiment.

Figure 13:
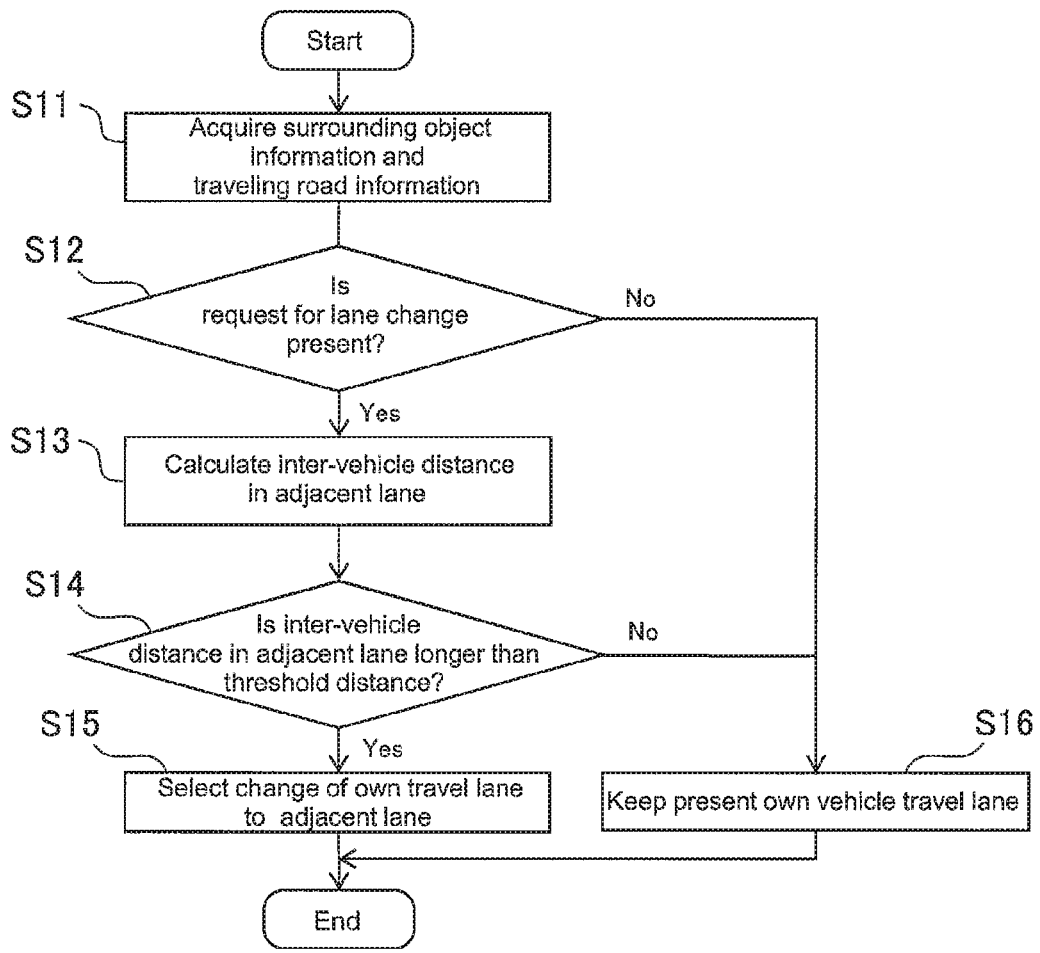
FIG. 13 is a flowchart illustrating a process of lane selection determination processing according to the third embodiment.

Here, FIG. 13 is a flowchart illustrating a process of the lane selection determination processing by the lane selection section 150. First, in step S11, the lane selection section 130 acquires the surrounding object information and the travel information from the surrounding object recognition section 120 and the traveling road recognition section 110. In step S12, the lane selection section 150 determines whether a request for lane change is present. When the request for lane change is not present, the lane selection section 150 selects to keep the present own vehicle travel lane in step S16.

When the request for lane change is present, the lane selection section 150 performs processing in step S13. In step S13, the lane selection section 150 calculates the inter-vehicle distance in the adjacent lane based on the surrounding object information and the traveling road information which are acquired in step S11. Note that the inter-vehicle distance in the adjacent lane mentioned here is the inter-vehicle distance between the vehicle and the vehicle, into which the own vehicle moves at the time of lane change to the adjacent lane.

In step S14, the lane selection section 150 compares the inter-vehicle distance in the adjacent lane calculated in step S13 and the threshold distance, and determines whether the inter-vehicle distance in the adjacent lane is longer than the threshold distance. When the inter-vehicle distance in the adjacent lane is the threshold distance or less, the lane selection section 150 selects to keep the present own vehicle travel lane in step S16. When the inter-vehicle distance in the adjacent lane is larger than the threshold distance, the lane selection section 150 selects to change the own vehicle travel lane to the adjacent lane, in step S15.

The lane selection section 150 repeatedly executes the lane selection determination processing illustrated in the flowchart at execution intervals which are set for each of the vehicles.

Next, a specific operation of the autonomous driving vehicles by the autonomous driving system according to the present embodiment will be described with a comparative example. The comparative example is operations of the autonomous driving vehicles by the autonomous driving system to which the present disclosure is not applied, and is illustrated in FIG. 6 as in the comparative example to the first embodiment. The operations of the autonomous driving vehicles by the autonomous driving system according to the present embodiment are illustrated in FIG. 7 similarly to the operations of the autonomous driving vehicles according to the first embodiment.

In FIGS. 6A and 7A, it is assumed that requests for lane change are detected in both of the two autonomous driving vehicles 1A and 1B. However, since the adjacent lane L1 has no empty space, the autonomous driving vehicles 1A and 1B keep the present lane L2.

Here, as illustrated in FIGS. 6B and 7B, it is assumed that the vehicle 212 which travels on the lane L1 moves to the lane L0, and thereby a larger inter-vehicle distance than the threshold distance is generated between the vehicle 211 and the vehicle 213 on the lane L1.

The inter-vehicle distance in the adjacent lane L1 becomes larger than the threshold distance, and thereby lane change to the lane L1 is selected in each of the autonomous driving systems according to the comparative example and the present embodiment. At this time, when the timings for lane selection determination processing coincide with each other between the autonomous driving vehicles 1A and 1B, the two autonomous driving vehicles 1A and 1B move to the lane L1 at the same time, as illustrated in FIGS. 6C and 7C.

As a result that the two autonomous driving vehicles 1A and 1B make lane change at the same time, a large inter-vehicle distance is generated between the vehicle 201 and the vehicle 202 on the left lane L2. In this case, in the comparative example, timings for lane selection determination processing coincide with each other again between the autonomous driving vehicles 1A and 1B, so that as illustrated in FIG. 6D, the two autonomous driving vehicles 1A and 1B move to the left lane L2 at the same time again in such a manner as to get into a space between the vehicle 201 and the vehicle 202. Thereafter, in the comparative example, the two autonomous driving vehicles 1A and 1B repeat moving to the central lane L1 from the left lane L2 at the same time, and immediately thereafter, moving to the left lane L2 from the central lane L1. That is, in the comparative example, hunting of lane change occurs.

Meanwhile, in the case of the autonomous driving system according to the present embodiment, there is the difference between the autonomous driving vehicles 1A and 1B in the execution interval of the lane selection determination processing, so that even if timings for determination happen to coincide with each other once, timings for the next determination do not coincide with each other. Consequently, as illustrated in FIG. 7D, the autonomous driving vehicle 1B in which the execution interval of the lane selection determination processing is short firstly moves to the left lane L2 in such a manner as to get into the space between the vehicle 201 and the vehicle 202. As a result that the autonomous driving vehicle 1B makes lane change, the inter-vehicle distance in the left lane L2 becomes short. As a result, the autonomous driving vehicle 1A does not select to move to the left lane L2, but selects to keep the central lane L1. Thereby, the autonomous driving vehicle 1A and the autonomous driving vehicle 1B travel on the different lanes, and an imbalance of the vehicle density between the lanes is reduced. Further, since a plurality of vehicles are restrained from making lane change to the adjacent lane at the same time, occurrence of hunting of lane change is avoided and a smooth traffic flow can be realized.

Fourth Embodiment

Figure 14:
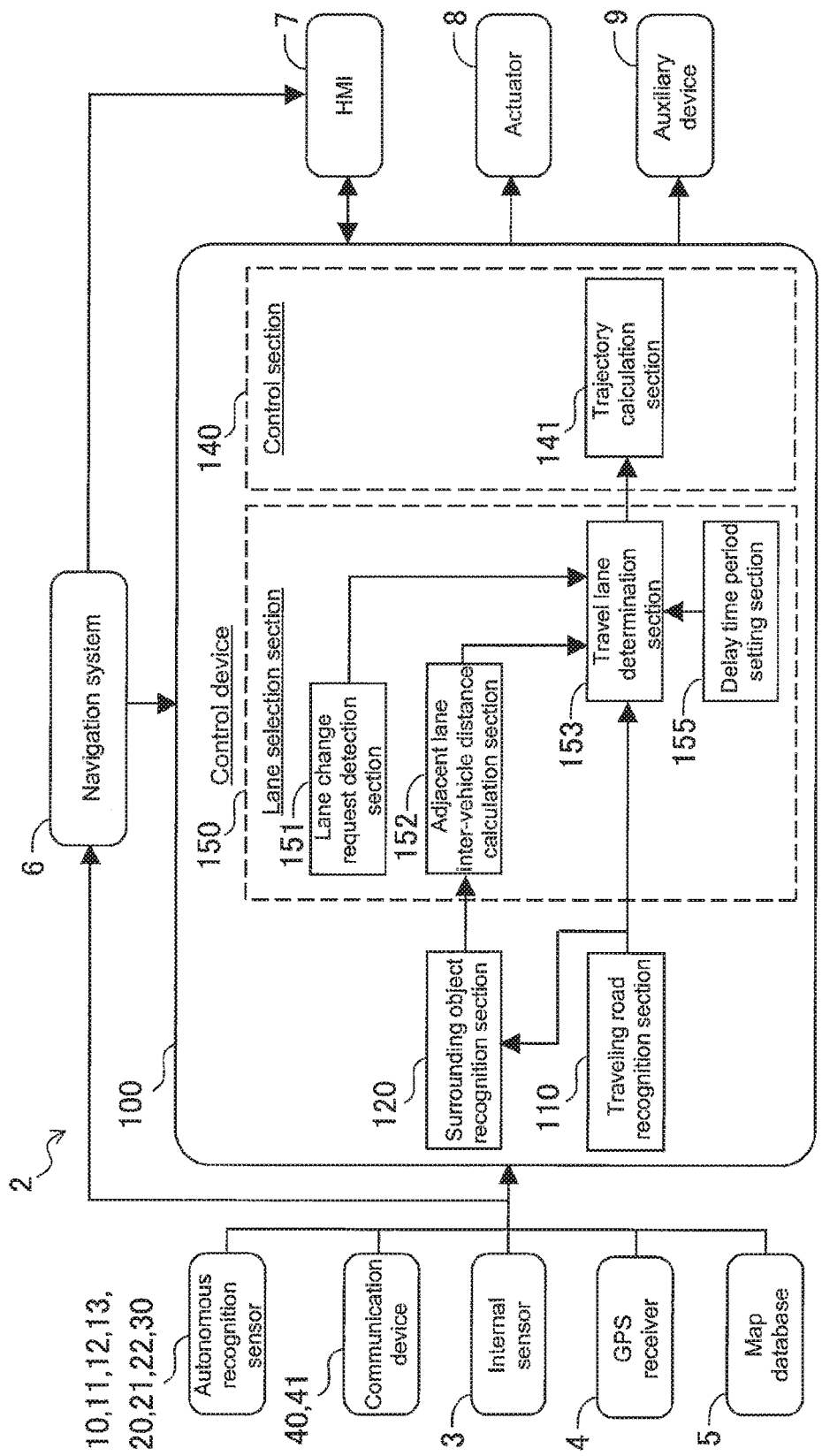
FIG. 14 is a block diagram illustrating a configuration of a control system of an autonomous driving vehicle according to a fourth embodiment.

An autonomous driving system according to the present embodiment is a traffic system that is constructed by a plurality of autonomous driving vehicles having the same function, for example, the autonomous driving vehicles 1 illustrated in FIG. 1, as in the autonomous driving system according to the first embodiment. FIG. 14 is a block diagram illustrating a configuration of the control system for an autonomous driving vehicle according to the present embodiment. In FIG. 14, functions relating to lane change of an own vehicle are specially expressed in blocks, among functions for autonomous driving which the control device 100 has. Note that in FIG. 14, as for functions common to the functions of the control device 100 according to the third embodiment, common reference signs are assigned to the blocks.

The lane selection section 150 of the control device 100 according to the present embodiment does not execute lane selection determination processing periodically, but executes lane selection determination processing with a request for lane change being detected as an execution condition. Further, the lane selection determination processing is not executed immediately after a request for lane change is detected, but a delay time period is provided in a period until the lane selection determination processing is executed after the request for lane change is detected.

The lane selection section 150 of the control device 100 according to the present embodiment includes a delay time period setting section 155, instead of the execution interval setting section 154 (refer to FIG. 12) included by the lane selection section 150 according to the third embodiment. The delay time period setting section 155 sets a delay time period in a period until execution of the lane selection determination processing after detection of the request for lane change. However, as for the delay time period that is set in the delay time period setting section 155, a common value is not set to all of the autonomous driving vehicles, but the delay time period is set with variation among the autonomous driving vehicles. Specifically, setting of the delay time period is performed for each of the vehicles by using similar methods to the setting methods (the first to ninth methods) of the execution interval described in the first embodiment.

Figure 15:
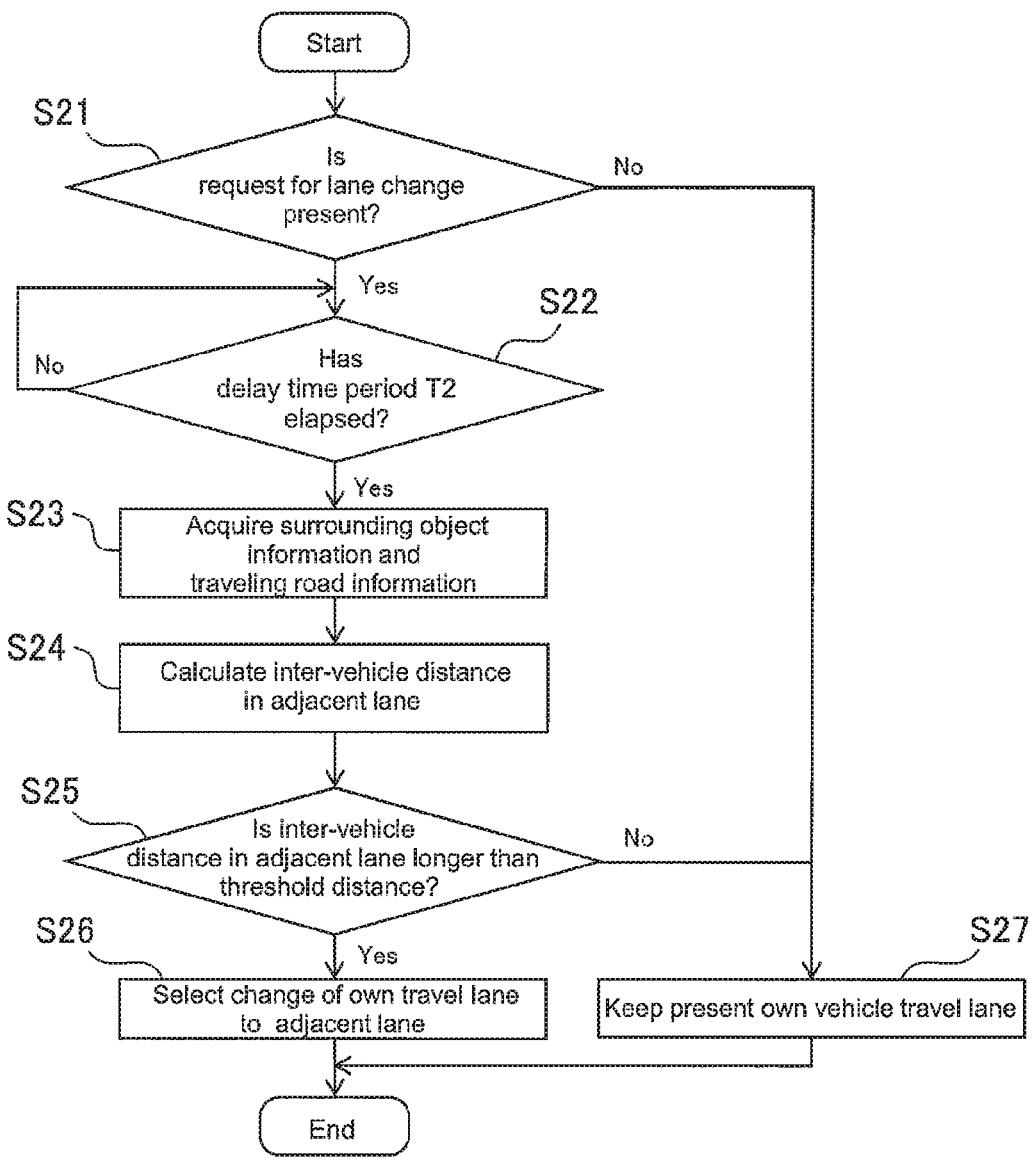
FIG. 15 is a flowchart illustrating a process of lane selection determination processing according to the fourth embodiment.

Here, FIG. 15 is a flowchart illustrating a process of the lane selection determination processing by the lane selection section 150. First, in step S21, the lane selection section 150 determines whether a request for lane change is present. When the request for lane change is not present, the lane selection section 150 selects to keep the present own vehicle travel lane in step S27.

When the request for lane change is detected, the lane selection section 150 starts measurement of a time period. In step S22, it is determined whether an elapsed time period after the request for lane change is detected reaches a delay time period T2. The delay time period T2 is a time period which is set for each of the vehicles, and the set values vary among the vehicles. Until the delay time period T2 elapses, it is selected to keep the present own vehicle travel lane.

After the lapse of the delay time period T2, the lane selection section 150 executes lane selection determination processing configured by processing from step S23 to step S26. In step S23, the lane selection section 150 acquires the surrounding object information and the traveling road information from the surrounding object recognition section 120 and the traveling road recognition section 110, respectively. In step S24, the lane selection section 150 calculates an inter-vehicle distance in the adjacent lane, in detail, an inter-vehicle distance between a vehicle and a vehicle, into which the own vehicle is likely to move when lane change is made, based on the surrounding object information and the traveling road information which are acquired in step S23.

In step S25, the lane selection section 150 compares the inter-vehicle distance in the adjacent lane, which is calculated in step S24, and the threshold distance, and determines whether the inter-vehicle distance in the adjacent lane is longer than the threshold distance. When the inter-vehicle distance in the adjacent lane is the threshold distance or less, the lane selection section 150 selects to keep the present own vehicle travel lane in step S27. When the inter-vehicle distance in the adjacent lane is longer than the threshold distance, the lane selection section 150 selects to change the own vehicle travel lane to the adjacent lane in step S26.

Figure 16:
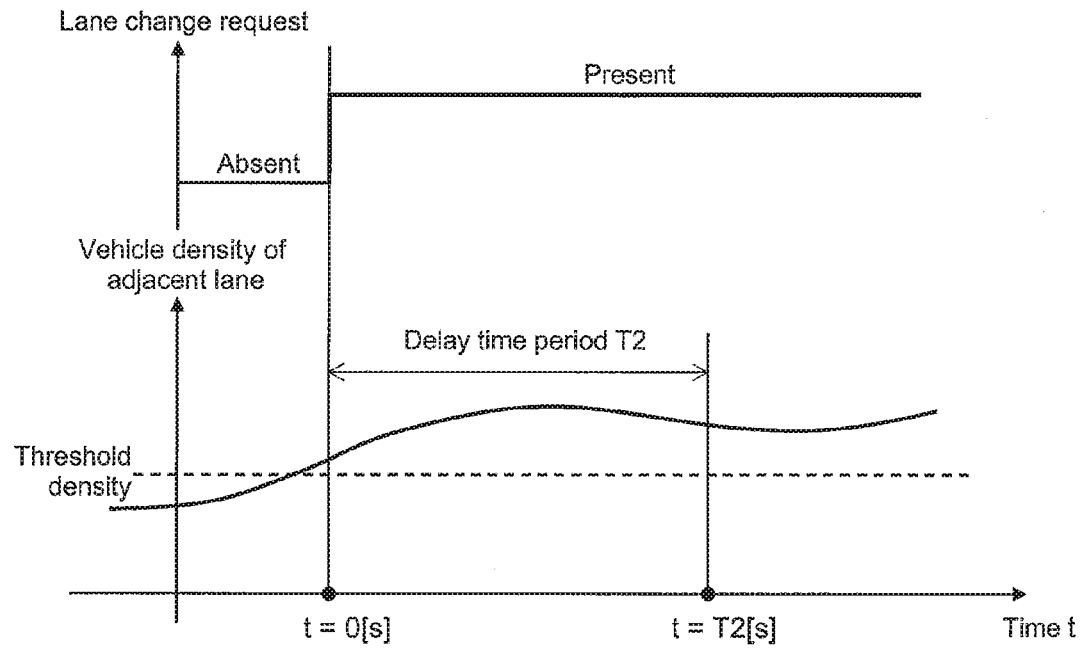
FIG. 16 is a diagram for explaining determination of lane selection by the control system of an autonomous driving vehicle according to the fourth embodiment.
Figure 17:
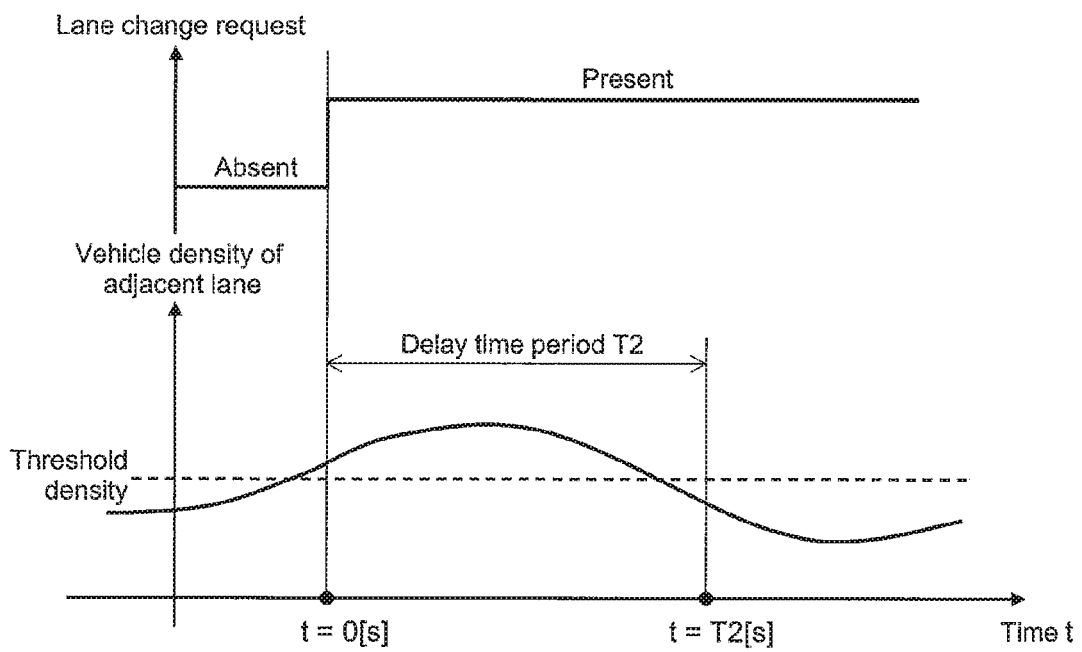
FIG. 17 is a diagram for explaining determination of lane selection by the control system of an autonomous driving vehicle according to the fourth embodiment.

FIGS. 16 and 17 are diagrams for explaining determination of lane selection by the control system for an autonomous driving vehicle according to the present embodiment. In the lane selection section 150, detection of a request for lane change is repeatedly performed at short execution intervals. When the request for lane change is detected in a certain timing, measurement of an elapsed time period from a time point of the detection is started in the lane selection section 150. At a time point when the elapsed time period after the request for lane change is detected reaches the delay time period T2, the lane selection determination processing is executed.

In the lane selection determination processing, lane selection is made based on an inter-vehicle distance in the adjacent lane at a time point when the delay time period T2 elapses. Consequently, when the inter-vehicle distance in the adjacent lane at the time point (the time point of t=T2) when the delay time period T2 elapses is longer than the threshold distance, as illustrated in FIG. 16, it is selected to change the own vehicle travel lane to the adjacent lane. However, when the inter-vehicle distance in the adjacent lane at the time point (the time point of t=T2) when the delay time period T2 elapses is shorter than the threshold distance as illustrated in FIG. 17, it is selected to keep the present own vehicle travel lane.

It is assumed that under a situation where a plurality of autonomous driving vehicles are traveling on the same lane, requests for lane change are detected in the respective vehicles at the same time. When the lane selection determination processing is executed immediately after detection of the requests for lane change, it can happen that the respective vehicles make lane change to the adjacent lane at the same time. However, in the autonomous driving system according to the present embodiment, the delay time period is set for each of the vehicles. Therefore, time periods until the lane selection determination processing is executed vary in the respective vehicles, a plurality of vehicles are restrained from making lane change to the adjacent lane at the same time.

Further, in a situation where the inter-vehicle distance in the adjacent lane changes with time, a length relation of the inter-vehicle distance in the adjacent lane and the threshold distance at the time point of the lapse of the delay time period also changes in accordance with a length of the delay time period which is set. Consequently, it can happen that lane change is made in a certain vehicle, whereas in another vehicle lane change is not made. Consequently, a plurality of vehicles are effectively restrained from making lane change to the adjacent lane at the same time.

Note that if a request for lane change is issued at the time point (the time point of t=T2) when the delay time period T2 elapses in the example illustrated in FIG. 17, the lane selection determination processing may be executed again at a time point (a time point of t=2*T2) at which the delay time period T2 further elapses from that time point. Alternatively, if the inter-vehicle distance in the adjacent lane becomes the threshold distance or less at the time point when the delay time period T2 elapses (the time point of t=T2), the request for lane change may be rejected. Further, when the inter-vehicle distance in the adjacent lane becomes the threshold distance or less in a period (t=a period from 0 to T2) until the delay time period T2 elapses, the request for lane change may be rejected at that time point.

What is claimed is:

1. An autonomous driving system comprising a plurality of autonomous driving vehicles,
wherein each of the plurality of autonomous driving vehicles comprises:
an information acquisition section configured to acquire information concerning an empty space situation in an adjacent lane that is adjacent to a lane where an own vehicle is traveling, when the own vehicle travels on a road having a plurality of lanes;
a lane selection section configured to execute lane selection determination processing of determining whether or not to select the adjacent lane as an own vehicle travel lane in accordance with the empty space situation in the adjacent lane, at predetermined execution intervals; and
a control section configured to perform lane change to the adjacent lane autonomously, or propose lane change to the adjacent lane to a driver, when the lane selection section selects the adjacent lane as the own vehicle travel lane,
wherein the predetermined execution interval of the lane selection determination processing is given variation among the plurality of autonomous driving vehicles.

2. The autonomous driving system according to claim 1, wherein an execution interval of the lane selection determination processing is fixed in each of the autonomous driving vehicles.

3. The autonomous driving system according to claim 1, wherein a value of an execution interval of the lane selection determination processing is changed every time the lane selection determination processing is executed.

4. An autonomous driving system comprising a plurality of autonomous driving vehicles,
wherein each of the plurality of autonomous driving vehicles comprises:
an information acquisition section configured to acquire information concerning an empty space situation in an adjacent lane that is adjacent to a lane where an own vehicle is traveling, when the own vehicle travels on a road having a plurality of lanes;
a lane selection section configured to execute lane selection determination processing of determining whether or not to select the adjacent lane as an own vehicle travel lane in accordance with the empty space situation in the adjacent lane; and
a control section configured to perform lane change to the adjacent lane autonomously, or propose lane change to the adjacent lane to a driver, when a lane change instruction is given from the lane selection section,
wherein the lane selection section is configured to give the lane change instruction to the control section, after waiting until a predetermined delay time period elapses, when the lane selection section selects the adjacent lane as the own vehicle travel lane, and
the predetermined delay time period is given variation among the plurality of autonomous driving vehicles.

5. The autonomous driving system according to claim 4, wherein the lane selection section is configured to perform the lane selection determination processing repeatedly at predetermined execution intervals that are shorter than the delay time period, and cancel giving the lane change instruction to the control section when a newest determination result of the lane selection determination processing at a time point when the delay time period elapses is negative.

6. An autonomous driving system comprising a plurality of autonomous driving vehicles,
wherein each of the plurality of autonomous driving vehicles comprises:
an information acquisition section configured to acquire information concerning an empty space situation in an adjacent lane that is adjacent to a lane where an own vehicle is traveling, when the own vehicle travels on a road having a plurality of lanes;
a lane selection section configured to execute lane selection determination processing of determining whether or not to select the adjacent lane as an own vehicle travel lane in accordance with the empty space situation in the adjacent lane, when the lane selection section detects a request for lane change; and
a control section configured to perform lane change to the adjacent lane autonomously, or propose lane change to the adjacent lane to a driver, when the lane selection section selects the adjacent lane as the own vehicle travel lane,
wherein the lane selection section is configured to execute the lane selection determination processing, after waiting until a predetermined delay time period elapses, when the lane selection section detects the request for lane change, and
the predetermined delay time period is given variation among the plurality of autonomous driving vehicles.

* * * * *